(12) United States Patent
Ise et al.

(10) Patent No.: US 10,347,906 B2
(45) Date of Patent: Jul. 9, 2019

(54) SECONDARY BATTERY, BATTERY PACK, AND VEHICLE

(71) Applicant: KABUSHIKI KAISHA TOSHIBA, Minato-ku (JP)

(72) Inventors: Kazuki Ise, Kawasaki (JP); Shinsuke Matsuno, Tokyo (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 133 days.

(21) Appl. No.: 15/698,345

(22) Filed: Sep. 7, 2017

(65) Prior Publication Data
US 2018/0269472 A1    Sep. 20, 2018

(30) Foreign Application Priority Data
Mar. 17, 2017  (JP) ................ 2017-052764

(51) Int. Cl.
*H01M 4/24* (2006.01)
*H01M 10/39* (2006.01)
(Continued)

(52) U.S. Cl.
CPC ............ *H01M 4/244* (2013.01); *B32B 27/06* (2013.01); *H01M 2/06* (2013.01); *H01M 2/065* (2013.01); *H01M 2/08* (2013.01); *H01M 2/1094* (2013.01); *H01M 4/0404* (2013.01); *H01M 10/36* (2013.01); *H01M 10/3945* (2013.01); *H01M 10/4207* (2013.01); *H01M 2004/021* (2013.01)

(58) Field of Classification Search
CPC ............ H01M 2/06; H01M 2/20; H01M 2/30; H01M 2/32; H01M 4/00; H01M 4/80; H01M 4/90; H01M 10/00
See application file for complete search history.

(56) References Cited

U.S. PATENT DOCUMENTS

| 6,403,253 B1 | 6/2002 | Wainwright |
| 2003/0031926 A1 | 2/2003 | Farmer et al. |

(Continued)

FOREIGN PATENT DOCUMENTS

| JP | 3-92359 U | 9/1991 |
| JP | 9-508490 A | 8/1997 |

(Continued)

OTHER PUBLICATIONS

S. Liu, et al., "Rechargeable Aqueous Lithium-Ion Battery of TiO$_2$/LiMn$_2$O$_4$ with a High Voltage", Journal of the Electrochemical Society, vol. 158 No. 12, 2011, pp. A1490-A1497.

*Primary Examiner* — James Lee
(74) *Attorney, Agent, or Firm* — Oblon, McClelland, Maier & Neustadt, L.L.P.

(57) ABSTRACT

According to one embodiment, a secondary battery is provided. The secondary battery includes a negative electrode including a negative electrode current collector, a negative electrode terminal electrically connected to the negative electrode current collector, a joint electrically connecting the negative electrode terminal and the negative electrode current collector, and a water repellent layer covering the joint. The joint is covered with the inner surface of the water repellent layer. A contact angle θ with respect to water on an outer surface of the water repellent layer satisfies 80°≤θ.

14 Claims, 10 Drawing Sheets

(51) Int. Cl.
    *B32B 27/06*      (2006.01)
    *H01M 10/42*      (2006.01)
    *H01M 4/04*      (2006.01)
    *H01M 2/06*      (2006.01)
    *H01M 2/08*      (2006.01)
    *H01M 2/10*      (2006.01)
    *H01M 10/36*      (2010.01)
    *H01M 4/02*      (2006.01)

(56) References Cited

U.S. PATENT DOCUMENTS

| | | |
|---|---|---|
| 2017/0110760 A1 | 4/2017 | Hatta et al. |
| 2017/0271682 A1 | 9/2017 | Matsuno et al. |
| 2017/0271717 A1 | 9/2017 | Yamashita et al. |

FOREIGN PATENT DOCUMENTS

| | | | |
|---|---|---|---|
| JP | 2000-77073 | A | 3/2000 |
| JP | 2003-17057 | A | 1/2003 |
| JP | 2004-36287 | A | 2/2004 |
| JP | 2005-71807 | A | 3/2005 |
| JP | 4761610 | B2 | 8/2011 |
| JP | 2015-220099 | A | 12/2015 |
| JP | 5882549 | B1 | 3/2016 |
| JP | 2017-174809 | A | 9/2017 |
| JP | 2017-174810 | A | 9/2017 |
| WO | WO 2015/046537 | A1 | 4/2015 |
| WO | WO 2015/166621 | A1 | 11/2015 |
| WO | WO 2017/135323 | A1 | 8/2017 |

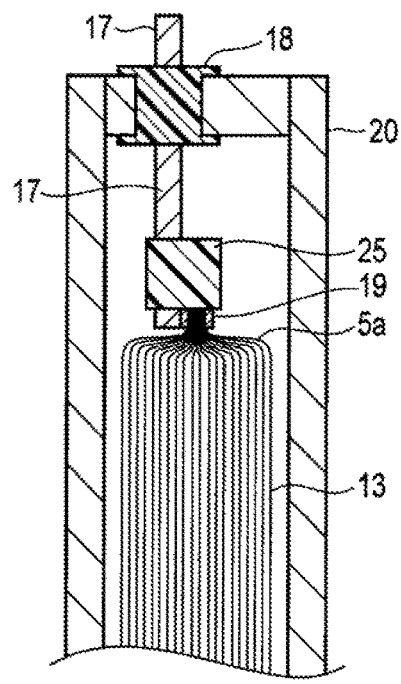
F I G. 7
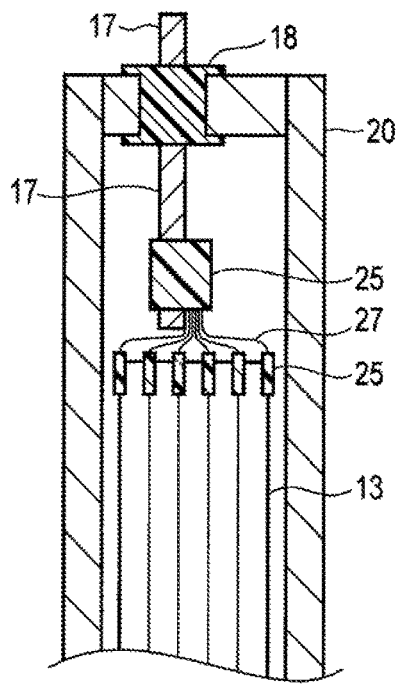
F I G. 8

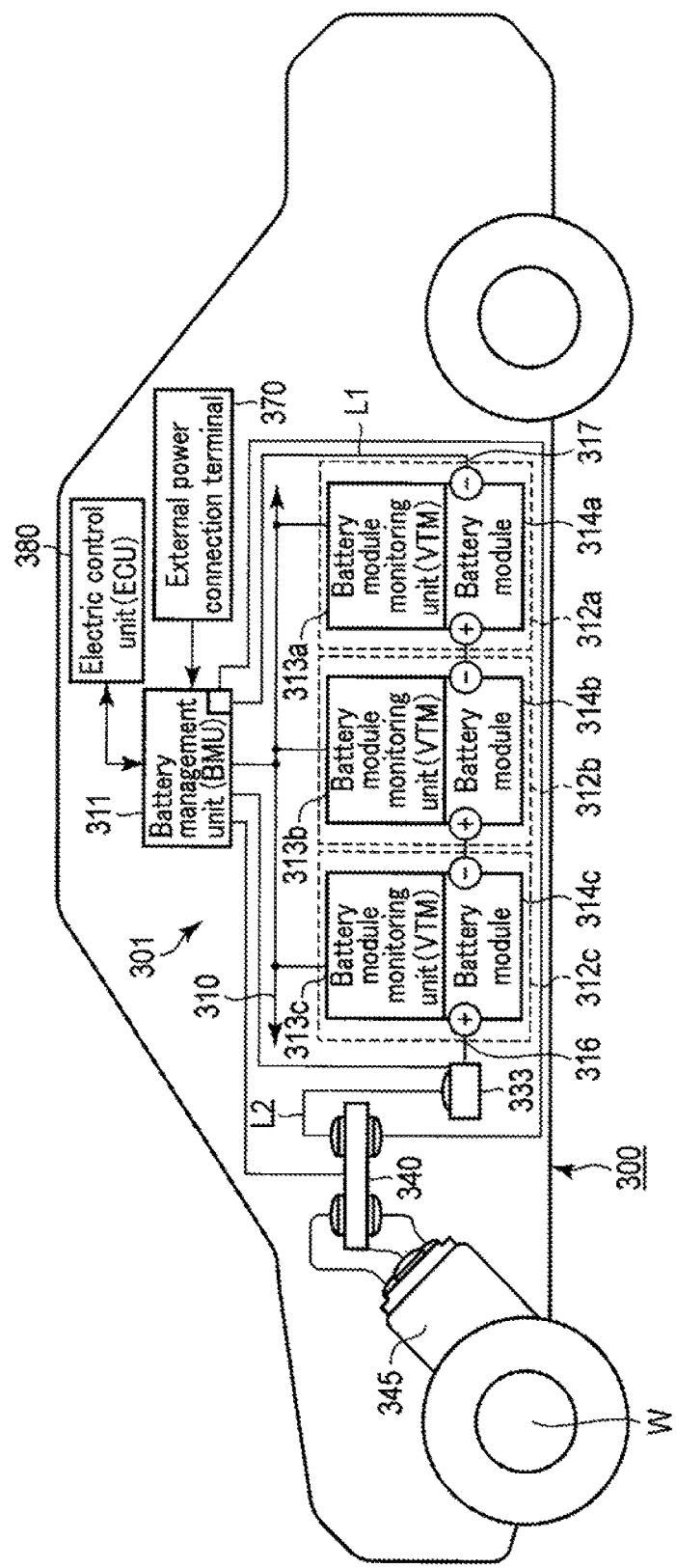
F I G. 16

SECONDARY BATTERY, BATTERY PACK, AND VEHICLE

CROSS-REFERENCE TO RELATED APPLICATIONS

This application is based upon and claims the benefit of priority from Japanese Patent Application No. 2017-052764, filed Mar. 17, 2017, the entire contents of which are incorporated herein by reference.

FIELD

Embodiments described herein relate generally to a secondary battery, a battery pack, and a vehicle.

BACKGROUND

In recent years, a battery using a nonaqueous solvent such as a lithium ion secondary battery has been developed as a high energy density type secondary battery. The lithium ion secondary battery is excellent in the energy density and cycle characteristic as compared to a lead storage battery and a nickel hydrogen secondary battery, and is expected as a large storage battery used as a vehicle power supply for a hybrid automobile or an electronic automobile.

As the electrolyte of the lithium ion secondary battery, for example, a nonaqueous electrolyte such as ethylene carbonate, diethyl carbonate, or propylene carbonate is used from the viewpoint of a wide electrochemical window. There is a problem with the safety of these solvents because they are combustible. For this reason, if the nonaqueous solvent-based electrolyte can be replaced with an aqueous solution-based electrolyte, this problem can be solved thoroughly. In addition, the aqueous solution-based electrolyte is more inexpensive than the nonaqueous solvent-based electrolyte, and the manufacturing process does not need an inert atmosphere. Hence, when the nonaqueous solvent-based is replaced with the aqueous solution-based electrolyte, the cost is expected to be largely reduced.

However, there is a large problem with the use of the aqueous solution-based electrolyte in the lithium ion secondary battery. A theoretical decomposition voltage calculated based on the chemical equilibrium of water is 1.23 V. Hence, if a battery is formed based on a higher design voltage than the theoretical decomposition voltage, oxygen is generated in the positive electrode, and hydrogen is generated in the negative electrode.

BRIEF DESCRIPTION OP THE DRAWINGS

FIG. 7 is a sectional view showing a case in which an example of a section of the secondary battery according to the embodiment is observed from a side;

FIG. 8 is a sectional view showing a case in which another example of the section of the secondary battery according to the embodiment is observed from a side;

FIG. 16 is a schematic view showing a detailed mode of a vehicle in which the secondary battery according to the embodiment is mounted.

DETAILED DESCRIPTION

Figure 1:
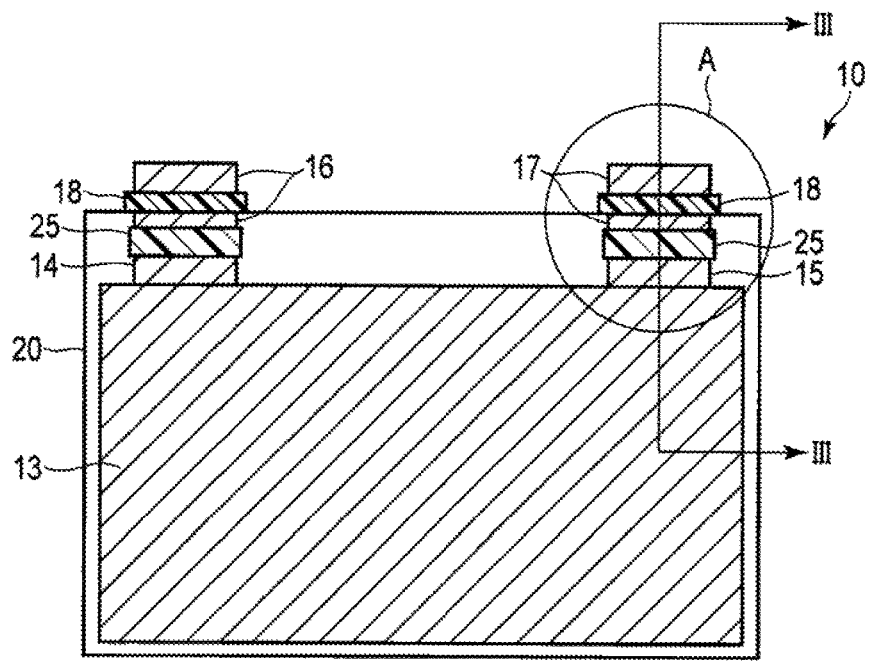
FIG. 1 is a sectional view schematically showing an example of a rectangular secondary battery according to an embodiment.

According to the first embodiment, a secondary battery is provided. The secondary battery includes a negative electrode including a negative electrode current collector, a negative electrode terminal electrically connected to the negative electrode current collector, a joint electrically connecting the negative electrode terminal and the negative electrode current collector, a water repellent layer covering the joint, a positive electrode, and an aqueous electrolyte containing at least one of lithium salt and sodium salt. Each of the negative electrode terminal and the negative electrode current collector includes zinc or an alloy containing zinc, or the negative electrode includes a coating layer containing boehmite in at least a part of a surface of each of the negative electrode terminal and the negative electrode current collector. The joint is covered with the inner surface of the water repellent layer. A contact angle θ with respect to water on an outer surface of the water repellent layer satisfies 80°≤θ.

According to the second embodiment, a battery pack is provided. The battery pack includes the secondary battery according to the first embodiment.

According to the third embodiment, a vehicle is provided. The vehicle includes the battery pack according to the second embodiment.

Embodiments will now be described with reference to the accompanying drawings. Note that the same reference numerals denote the same parts throughout the embodiments, and a repetitive description thereof will be omitted. The drawings are schematic views for explaining the embodiments and promoting understanding of the embodiments. Shapes, sizes, ratios, and the like are different from those in an actual device, and the design can appropriately be changed in consideration of the following explanation and known techniques.

First Embodiment

According to the first embodiment, a secondary battery is provided. The secondary battery includes a negative electrode including a negative electrode current collector, a negative electrode terminal electrically connected to the negative electrode current collector, a joint electrically connecting the negative electrode terminal and the negative electrode current collector, a water repellent layer covering the joint, a positive electrode, and an aqueous electrolyte containing at least one of lithium salt and sodium salt. Each of the negative electrode terminal and the negative electrode current collector includes zinc or an alloy containing zinc, or the negative electrode includes a coating layer containing boehmite in at least a part of a surface of each of the negative electrode terminal and the negative electrode current collector. The joint is covered with the inner surface of the water repellent layer. A contact angle θ with respect to water on an outer surface of the water repellent layer satisfies $80° \leq \theta$.

In the secondary battery using the aqueous electrolyte, if hydrogen is generated in the negative electrode, the charge-and-discharge efficiency of the negative electrode becomes lower than the charge-and-discharge efficiency of the positive electrode. Hence, if the charge-and-discharge cycle is repeated, the positive electrode gradually changes to an over-charge state. As a result, the positive electrode degrades early, leading to difficulty in operating the secondary battery.

To suppress hydrogen generation in the negative electrode, it can be considered that, for example, the negative electrode current collector is made of a metal with a high hydrogen overvoltage such as zinc, and the negative electrode current collector surface is covered with a passive film.

However, even if such a negative electrode current collector is used, an applied voltage probably locally rises due to current concentration to a portion of the negative electrode current collector which is not covered with the passive film and the corners and pointed portions of the negative electrode current collector. A large quantity of hydrogen may be generated in such a high voltage application portion.

When producing the secondary battery, the negative electrode terminal and the negative electrode current collector need to be connected. As a method of connecting the negative electrode terminal and the negative electrode current collector, for example, welding or contact bonding is usable.

When connecting the negative electrode terminal and the negative electrode current collector by welding, a metal as a base material, for example, aluminum is exposed at the welded portion between the negative electrode terminal and the negative electrode current collector even if the whole surface of the negative electrode terminal and the whole surface of the negative electrode current collector are covered with the passive film. When connecting the negative electrode terminal and the negative electrode current collector by contact bonding as well, it is difficult to connect them so the metal as the base material is not exposed at all. As a result, the aqueous electrolyte comes into contact with the exposed portion where the metal as the base material is exposed, and hydrogen generation is promoted. If hydrogen is generated, for example, the current collector surface is corroded, or the contact resistance of the joint increases, resulting in lowering of the negative electrode efficiency.

To prevent this, the negative electrode provided in the secondary battery according to the embodiment includes a water repellent layer that covers the joint between the negative electrode terminal and the negative electrode current collector. On a surface of the water repellent layer which does not face the joint, the contact angle θ with respect to water satisfies $80° \leq \theta$. If the joint is covered with the water repellent layer, the metal that is the base material of the negative electrode terminal or the negative electrode current collector does not come into contact directly with the aqueous electrolyte. Hence, hydrogen generation in the negative electrode can be suppressed. As a result, a secondary battery capable of achieving excellent cycle life performance can be obtained.

The secondary battery according to this embodiment will be described below in detail.

The secondary battery according to the embodiment includes, for example, a negative electrode, a negative electrode terminal, a positive electrode, a positive electrode terminal, and an aqueous electrolyte. A separator may intervene between the positive electrode and the negative electrode. The secondary battery may further include a container that stores, for example, the negative electrode, the negative electrode terminal, the positive electrode, the positive electrode terminal, the aqueous electrolyte, and the separator. The secondary battery may further include a negative electrode lead capable of electrically connecting the negative electrode and the negative electrode terminal, and a positive electrode lead capable of electrically connecting the positive electrode and the positive electrode terminal.

The negative electrode, the negative electrode terminal, the positive electrode, the positive electrode terminal, the aqueous electrolyte, the separator, and the container will be described below.

(1) Negative Electrode

The negative electrode includes a negative electrode current collector, and a negative electrode active material-containing layer supported on one or both surfaces of the negative electrode current collector and containing an active material, a conductive agent, and a binder. The negative electrode current collector may include a negative electrode tab portion. The negative electrode active material-containing layer is provided on the negative electrode current collector except at least the negative electrode tab portion.

The negative electrode current collector is made of zinc or an alloy containing zinc or includes a coating layer containing boehmite in at least a part. If the negative electrode current collector includes the coating layer, it is preferable that the whole surface of the negative electrode current collector is covered with the coating layer.

The negative electrode current collector includes, for example, two sides where the negative electrode active material-containing layer is not provided. The two sides are negative electrode active material-containing layer non-forming portions where the negative electrode active material-containing layer is not formed. The negative electrode tab portion projects from, for example, the vicinity of the center of one of the two sides in the short-side direction of the negative electrode.

Zinc has a high hydrogen overvoltage because the exchange current density is low. For this reason, hydrogen generation hardly occurs in the negative electrode current collector containing zinc. Hence, when the negative electrode current collector includes zinc or an alloy containing zinc, hydrogen generation from the negative electrode current collector can be suppressed. The negative electrode current collector may be made of zinc or an alloy containing zinc.

If the negative electrode current collector is provided with a coating layer containing boehmite, the hydrogen overvoltage can be raised as compared to a case in which such a coating layer is not provided. Though the reason remains uncertain, the present inventors estimate it as follows. Boehmite has a surface structure terminated by a hydroxyl group. When hydrogen is generated from the negative electrode current collector provided with the coating layer containing boehmite, probably, the hydroxyl group adsorbs a proton, and an electron is supplied from the electrode to the proton, thereby generating hydrogen. At this time, one of the proton adsorption by the hydroxyl group, the electron movement from the electrode, and the hydrogen generation reaction is considered to be slow from the kinetic viewpoint. In addition, it is considered that a possibility that the hydroxyl group on the surface of boehmite physically adsorbs anions and/or cations in the electrolyte. If the hydroxyl group adsorbs anions and/or cations, the proton adsorption by the hydroxyl group hardly occurs. As a result, the hydrogen overvoltage is considered to rise.

In addition, since boehmite that, for example, functions as a passive film is a chemically stable material. For this reason, even if the potential is lowered to the reduction side (if the potential is a base potential), boehmite is considered to stably exist without being corroded and changing the structure.

The coating layer containing boehmite may contain hydrated aluminum oxide other than boehmite. The coating layer is preferably made of boehmite. The content of boehmite in the coating layer is, for example, 60 mass % or more.

The thickness of the coating layer containing boehmite is, for example, 10 nm to 1000 nm, preferably 100 nm to 800 nm, and more preferably 200 nm to 500 nm.

If the negative electrode current collector includes the coating layer containing boehmite in at least a part, the negative electrode current collector is preferably an aluminum foil or an aluminum alloy foil containing at least one element (one element or two or more elements) selected from the group consisting of Mg, Ti, Mn, Fe, Cu, and Si. The coating layer preferably covers the entire surface of the negative electrode current collector. If the negative electrode current collector includes a negative electrode tab portion, the coating layer preferably covers the negative electrode tab portion as well. The negative electrode current collector may have another form such as a porous body or a mesh.

The purity of the aluminum foil is preferably 99 mass % or more, more preferably 99.3 mass % or more, and still more preferably 99.85 mass % or more.

As the aluminum alloy, an alloy containing an element such as magnesium, zinc, or silicon is preferable. On the other hand, the content of a transition metal such as iron, copper, nickel, or chromium is preferably set to 1 mass % or less.

The thickness of the negative electrode current collector ranges from, for example, 10 μm to 500 μm. If the thickness is less than 10 μm, tearing during the manufacture occurs at a high possibility. If the thickness exceeds 500 μm, the volume energy density of the battery may lower. The thickness of the negative electrode current collector is preferably 20 μm or less, and more preferably 15 μm or less.

The secondary battery according to the embodiment includes a joint configured to electrically connect the negative electrode terminal and the negative electrode current collector. For example, the negative electrode current collector is joined to the negative electrode terminal (to be described later) by welding or the like. If the negative electrode current collector includes a negative electrode tab portion, the negative electrode terminal is joined to the negative electrode tab portion. Alternatively, the negative electrode terminal and the negative electrode current collector may be electrically connected via a negative electrode lead. In this case, for example, one end of the negative electrode lead is joined to the negative electrode terminal to form a joint, and the other end of the negative electrode lead is joined to the negative electrode current collector to form a joint. Preferably, the negative electrode lead is made of zinc or an alloy containing zinc, or is made of aluminum including a coating layer containing boehmite in at least a part of the surface.

A method of joining the negative electrode current collector and the negative electrode terminal is not particularly limited. For example, the joint may be a portion formed by welding the negative electrode current collector and the negative electrode terminal, as described above, a portion formed by contact bonding the negative electrode current collector and the negative electrode terminal using a clamp member or the like, or a portion formed by joining the negative electrode current collector and the negative electrode terminal by caulking. Joining of the negative electrode current collector and the negative electrode terminal is done by a method selected from the group consisting of, for example, ultrasonic welding, resistance welding, laser welding, and joining by contact bonding.

The joint configured to electrically connect the negative electrode terminal and the negative electrode current collector is covered with the water repellent layer. If the negative electrode includes two or more joints, all the joints are covered with the water repellent layer.

The water repellent layer includes at least two principal surfaces, that is, an inner surface and an outer surface. At least a part of the inner surface covers the joint. The inner surface of the water repellent layer is made of, for example, an adhesive material. Examples of the adhesive material are silicone and acrylic polymer. The water repellent layer is formed by, for example, bonding its inner surface to the joint. The water repellent layer may be formed by applying a water repellent material (to be described later) so as to cover the joint and then heating and fusing the water repellent material. The water repellent layer may be formed by contact-bonding a water repellent material to the joint.

From the viewpoint of adhesion and covering properties of the water repellent layer, the water repellent layer is preferably formed by applying a water repellent material to the joint and then heating and fusing the water repellent material. If the water repellent layer is formed by heating and fusing the water repellent material, adhesion of the water repellent layer to the joint increases, and a wide range of the joint can easily be covered.

On the outer surface of the water repellent layer, the contact angle θ with respect to water satisfies 80°≤θ. The contact angle θ more preferably satisfies 100°≤θ. For example, the contact angle θ satisfies θ≤180°. The contact angle θ with respect to water may satisfy 80°≤θ not only on the outer surface of the water repellent layer but also on the inner surface of the water repellent layer. The definition and measuring method of the contact angle θ will be described later.

If the contact angle θ<80°, water molecules are undesirably readily adsorbed to the surface of the water repellent layer. In this case, water readily enters from pores of the water repellent layer and reaches the joint. Alternatively, water may readily enter between the water repellent layer and the joint. If water contacts the joint, hydrogen is generated, and peeling of the water repellent layer occurs early. As a result, the negative electrode charge-and-discharge efficiency lowers, and the secondary battery degrades early.

The water repellent layer is preferably provided not only on the joint but also on at least a part of a negative electrode edge portion of the surface of the negative electrode current collector except the negative electrode tab portion. If the water repellent layer is provided on at least a part of the negative electrode edge portion as well, the effect of suppressing hydrogen generation is enhanced, and the negative electrode charge-and-discharge efficiency improves. The water repellent layer is more preferably provided so as to reduce the area of the exposed portion of the negative electrode edge portion.

The water repellent layer is more preferably provided so as to reduce the area of the exposed portion of the negative electrode tab portion. Since this can reduce the contact area between the negative electrode tab portion and the aqueous electrolyte, hydrogen generation can be suppressed.

The water repellent layer contains at least one water repellent material selected from the group consisting of, for example, polytetrafluoroethylene (PTFE), tetrafluoroethylene (TFE), tetrafluoroethylene-hexafluoropropylene copolymer (FEP), polypropylene, polyethylene, polyimide, polystyrene, and silicone. The water repellent layer may be made of one water repellent material or a mixture of two or more water repellent materials.

To make it difficult for water permeating the water repellent layer to reach the joint, the water repellent layer is preferably relatively thick. However, if the water repellent layer is too thick, the volume energy density of the battery or handling property in assembling the battery undesirably lowers. The thickness of the water repellent layer falls within a range of, for example, 0.1 µm to 500 µm.

<Definition of Contact Angle $\theta$>

Figure 12:
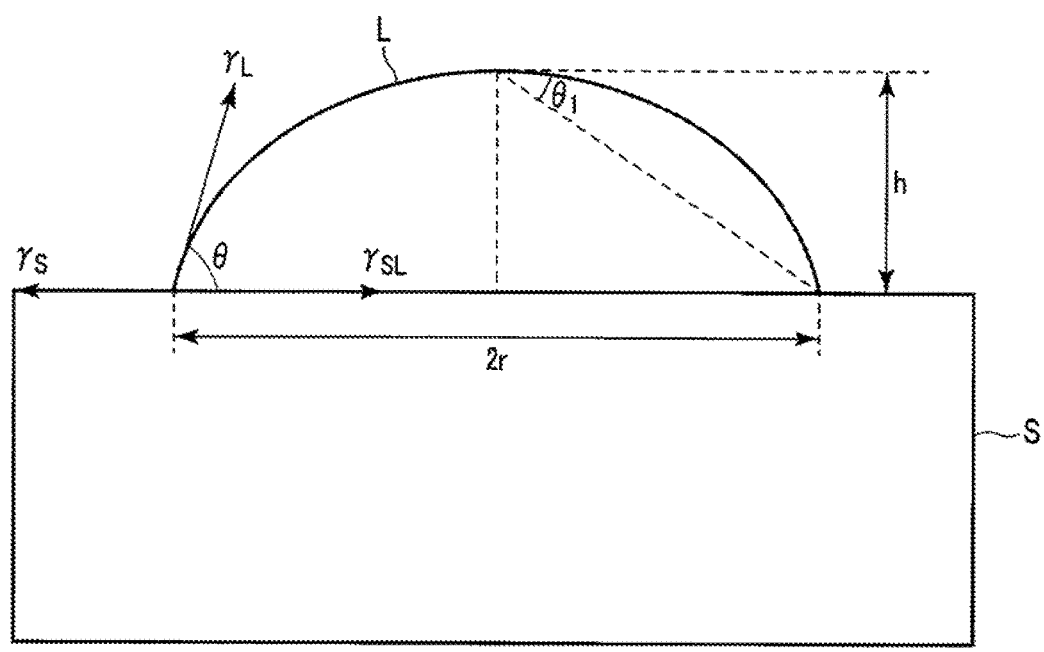
FIG. 12 is a sectional view schematically showing a state in which a solid and a liquid are in contact.

The definition of the contact angle $\theta$ will be described with reference to FIG. 12. FIG. 12 is a sectional view schematically showing a state in which a liquid L is in contact with the surface of a solid S. The contact angle is defined as an index representing the affinity of the liquid on the solid surface.

For a surface tension $\gamma_S$ of the solid S, a surface tension $\gamma_L$ of the liquid L, and an interfacial tension $\gamma_{SL}$ between the solid S and the liquid L, the Young's formula below holds mechanically. An angle $\theta$ which meets the Young's formula is defined as a contact angle.

$$\cos\theta = (\gamma_S - \gamma_{SL})/\gamma_L$$

<Measuring Method of Contact Angle $\theta$>

First, the battery is discharged completely and then disassembled. The completely discharged state is a state where Li inserted in the negative electrode is extracted, and the secondary battery has no remaining capacity. Next, the water repellent layer provided to cover the welded portion between the terminal and the current collector is cut out in an area of 10 mm² or more and smoothened to eliminate the slope at the measurement point. After that, the cut water repellent layer is cleaned using pure water to wash away the electrolyte. The water repellent layer as the measurement target is thus prepared.

For the water repellent layer as the measurement target, the contact angle $\theta$ is measured using a contact angle meter in the atmosphere as follows. A predetermined amount of water is dropped onto a measurement sample, and the shape of the water droplet is observed from the sectional direction by using, for example, the CCD camera which is provided with the contact angle meter. The amount of water droplet is, for example, 1 µL. Based on an observed image 10 sec after the dropping, the contact angle $\theta$ is measured using the parameters shown in FIG. 12.

The contact angle $\theta$ is calculated by a $\theta/2$ method to be described below.

The $\theta/2$ method is a method of assuming a dropped small droplet as a sphere and obtaining $\theta$ based on a distance $2r$ (also see FIG. 12) between the left and right endpoints calculated from the contact portion between the droplet and the solid surface and a height h of the droplet by the below formulae.

$$\tan\theta_1 = h/r$$

$$\theta = 2\theta_1$$

The coating layer which may be included in the negative electrode current collector, the negative electrode terminal, and the negative electrode tab portion may be formed by, for example, anode oxidation or boehmite process to be described below.

Whatever the method for forming the coating layer, alkaline degreasing of the surface of the process target object is sufficiently done before production. Impurities and a natural oxide film on the surface of the process target object can be removed by the decreasing. Hence, in the anode oxidation or boehmite process, when immersing the process target object in a solution, readhesion of impurities and reoxidation of the surface can be suppressed.

(Anode Oxidation Method)

The anode oxidation method is a method including: immersing a process target object in an electrolyte solution; and applying a direct current or a high voltage to the process target object as a positive electrode to form an oxidized film on the surface of the process target object.

The electrolyte solution is, for example, sulfuric acid, oxalic acid, phosphoric acid or chromic acid. It is preferable that the electrolyte solution is one in which dissolved oxygen is sufficiently removed by jetting nitrogen as bubbles in advance. The dissolved oxygen in the electrolyte solution is sufficiently removed, thereby suppressing the pinhole formation caused by oxidation.

It is preferable to perform an anode oxidation treatment in an inert atmosphere in order to prevent oxygen from being mixed with the electrolyte solution during the treatment. The inert atmosphere may be, for example, a nitrogen atmosphere.

When a film having a thickness of about 15 nm or more is formed by the anode oxidation method, the film is porous. Thus, when a process target object having the film in this state is used for an aqueous secondary battery, a water molecule enters into pores and hydrogen generates from the pores, thereby breaking the cover layer.

Therefore, it is preferable to perform a pore sealing treatment. The pore sealing treatment is performed by, for example, immersing the process target object having the above film in boiled pure water. As a result of the pore sealing treatment, boehmite is formed so as to seal the pores. The pore sealing treatment may be performed on a film having a thickness of less than 15 nm.

When a process target object with a small thickness is used in the anode oxidation method, the process target object may not endure an applied voltage or current, which may lead to breakage. When the anode oxidation method is performed using a process target object with a large thickness, a film to be formed is not broken and a cover layer with a sufficient thickness is formed on the surface. As the voltage to be applied is made smaller, the film to be formed tends to become thinner. As the voltage to be applied is made larger, the film to be formed tends to become thicker. In other words, the thickness varies depending on the voltage to be applied.

The anode oxidation method has difficulty in appropriately forming a cover layer in the case of using a process target object with a thickness of about 100 μm or less. As described above, in order to form a cover layer on a relatively thin process target object, the following boehmite-treatment method may be employed. In this regard, the boehmite-treatment method may be used to form a cover layer on the process target object with a thickness of 100 μm or more.

(Boehmite-Treatment Method)

The boehmite-treatment method is a method including: boiling pure water or an aqueous solution containing a small amount of alkali (e.g., triethanolamine) as an additive; and immersing a process target object therein to form a cover layer. When the boiled solution contains alkali, the solution functions as a growth agent. Accordingly, the formation of the boehmite layer on the surface of the process target object is promoted, thereby forming a thick cover layer with a sufficient film property.

As described above, the boehmite-treatment method may be used form a cover layer on a relatively thin process target object. It is preferable that the use of the relatively thin current collector increases the volume energy density of a battery.

In the boehmite-treatment method, when the time immersing the process target object in the boiled solution is shortened, the film to be formed tends to become thinner. When the time immersing the process target object in the boiled solution is lengthen, the film to be formed tends to become thicker.

In the case of using either the anode oxidation method or the boehmite-treatment method, after forming the cover layer, the drying process is preferably a natural drying process. For example, the drying process is preferably performed at a temperature of 80° C. or less for about 1 hour. When the drying process is performed at a relatively high temperature (e.g., 100° C.), dry spots form on the cover layer, thereby reducing the coatability.

The negative electrode active material-containing layer is provided on the negative electrode current-collector in a weight per unit area ranging from, for example, 20 g/m² to 500 g/m². If the weight per unit area falls within this range, reversible charge can be performed. An active material layer whose weight per unit area is less than 20 g/m² is undesirable because its manufacture by application is difficult. In an active material layer whose weight per unit area exceeds 500 g/m², the Li concentration gradient in the layer when Li insertion/extraction at the time of charge and discharge becomes large, and therefore, the battery characteristic may degrade.

As the negative electrode active material, at least one material (one material or two or more materials) of titanium-containing oxides such as titanium oxide, lithium titanium oxide, niobium titanium oxide, and sodium niobium titanium oxide. The Li insertion potential of the titanium-containing oxide preferably ranges from 1.2 V (vs. Li/Li⁺) to 2.0 V (vs. Li/Li⁺). The negative electrode active material can include at least one of the titanium-containing oxides.

Titanium oxides include, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

Lithium titanium oxides include, for example, a lithium titanium oxide having a spinel structure (for example, the general formula is $Li_{4+x}Ti_5O_{12}$ ($-1 \leq x \leq 3$)), a lithium titanium oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$). The lithium titanium oxide may be a lithium titanium composite oxide in which a dopant is introduced.

Niobium titanium oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

Sodium niobium titanium oxides include, for example, an orthorhombic Na-containing niobium titanium composite oxide represented by a general formula $Li_{2+v}Na_{2-w}M1_x Ti_{6-y-z}Nb_yM2_zO_{14+\delta}$ ($0 \leq v \leq 4$, $0 < w < 2$, $0 \leq x < 2$, $0 < y < 6$, $0 \leq z < 3$, $-0.5 \leq \delta \leq 0.5$, M1 includes at least one material selected from the group consisting of Cs, K, Sr, Ba, and Ca, and M2 includes at least one material selected from the group consisting of Zr, Sn, V, Ta, Mo, W, Fe, Co, Mn, and Al).

The negative electrode active material is preferably at least one selected from the group consisting of a spinel-type lithium titanate (for example, $Li_4Ti_5O_{12}$) and an anatase-type titanium oxide (for example, $TiO_2$). These active materials have a low operating potential. Although the secondary battery includes these active materials, the secondary battery including the water repellent layer of the embodiment can suppress hydrogen generation from the joint configured to electrically connect the negative electrode terminal and the negative electrode current collector, and can suppress an increase in the contact resistance at the joint. As a result, it is possible to achieve a high energy density and achieve excellent cycle life performance.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

If necessary, the conductive agent is added in order to improve the current collection performance and suppress the contact resistance of the active material to the current collector. Examples of the conductive agent include carbonaceous substances such as acetylens black, ketjen black, graphite, and coke. The conductive agent may be used singly, or in mixture of two or more kinds thereof.

The binder functions to bond the active material and the conductive agent to be adhered to the current collector. As the binder, for example, at least one selected from the group consisting of polytetrafluoroethylene (PTFE), polyvinylidene fluoride (PVdF), a cellulose-based material (e.g., sodium carboxymethyl cellulose (CMC)), fluorine-based rubber, styrene butadiene rubber, an acrylic resin or its copolymer, polyacrylic acid, and polyacrylonitrile may be used, but is not limited thereto. The binder may be used singly, or in mixture of two or more kinds thereof.

As for the compounding ratio of the negative electrode active material, the conductive agent, and the binder in the negative electrode active material layer, it is preferable that the content of the negative electrode active material is front 60% by weight to 95% by weight, the content of the negative electrode conductive agent is from 2% by weight to 20% by weight, the content of the binder is from 2% by weight to 20% by weight. When the content of the conductive agent is less than 2% by weight, the current collection performance of the negative electrode active material layer is lowered and high current performance of the battery may be reduced. When the content of the binder is less than 2% by weight, the binding property of the negative electrode active material layer and the negative electrode current collector is lowered and cycle performance may be reduced. Meanwhile, from the viewpoint of performance of high capacity, the content of the conductive agent is preferably 10% by weight or less and the content of the binder is preferably 10% by weight or less.

The negative electrode can be produced by, for example, the following method. First, the negative electrode active material, the conductive agent, and the binder are suspended in an appropriate solvent to prepare a slurry. The slurry is applied to one or both surfaces of a negative electrode current collector. A negative electrode active material-containing layer is formed by drying the coating on the negative electrode current collector. After that, the negative electrode current collector and the negative electrode active material-containing layer formed thereon are pressed. As the negative electrode active material-containing layer, a layer made of a negative electrode active material, a conductive agent, and a binder which are formed in pellets may be used.

(2) Negative Electrode Terminal

The negative electrode terminal can be electrically connected to the negative electrode current collector. Alternatively, the negative electrode terminal can be electrically connected to the negative electrode current collector via a negative electrode lead.

The negative electrode terminal includes zinc or an alloy containing zinc, or a coating layer containing boehmite in at least a part. The negative electrode terminal may be made of zinc or an alloy containing zinc. If the negative electrode terminal includes the coating layer, it is preferable that the whole surface of the negative electrode terminal is covered with the coating layer. To reduce the contact resistance, the negative electrode terminal is preferably made of the same material as the negative electrode current collector.

If the negative electrode terminal includes the coating layer containing boehmite in at least a part, the negative electrode terminal is preferably made of aluminum or an aluminum alloy containing at least one element (one element or two or more elements) selected from the group consisting of Mg, Ti, Mn, Fe, Cu, and Si.

(3) Positive Electrode

The positive electrode includes a positive electrode current collector, and a positive electrode active material-containing layer supported on one or both surfaces of the positive electrode current collector and containing an active material, a conductive agent, and a binder. The positive electrode current collector may include a positive electrode tab portion. The positive electrode active material-containing layer is provided on the positive electrode current collector except at least the positive electrode tab portion.

The positive electrode current collector is made of, for example, a metal such as stainless steel, Al, or Ti. The positive electrode current collector has a form of, for example, a foil, a porous body, or a mesh. To prevent the current collector from being corroded by the reaction between the current collector and the electrolyte, the current collector surface may be covered with a dopant. The positive electrode current collector is preferably made of a material with high resistance to corrosion and oxidation, for example, a Ti foil. Note that if $Li_2SO_4$ is used as lithium salt used in the electrolyte (to be described later), corrosion does not progress. Hence, Al may be used as the positive electrode current collector in this case.

The secondary battery according to the embodiment includes a joint configured to electrically connect the positive electrode terminal and the positive electrode current collector. For example, the positive electrode current collector is joined to the positive electrode terminal (to be described later) by welding or the like. If the positive electrode current collector includes a positive electrode tab portion, the positive electrode terminal is joined to the positive electrode tab portion. Alternatively, the positive electrode terminal and the positive electrode current collector may be electrically connected via a positive electrode lead. In this case, for example, one end of the positive electrode lead is joined to the positive electrode terminal to form a joint, and the other end of the positive electrode lead is joined to the positive electrode current collector to form a joint.

A method of joining the positive electrode current collector and the positive electrode terminal is not particularly limited. For example, the joint may be a portion formed by welding the positive electrode current collector and the positive electrode terminal, as described above, a portion formed by contact-bonding the positive electrode current collector and the positive electrode terminal, or a portion formed by joining the positive electrode current collector and the positive electrode terminal by swaging. The positive electrode current collector and the positive electrode terminal are preferably welded because the resistance is low.

The joint configured to electrically connect the positive electrode terminal and the positive electrode current collector is preferably covered with the above-described water repellent layer. This can suppress oxygen generation from the joint.

The water repellent layer is preferably provided not only on the joint configured to electrically connect the positive electrode terminal and the positive electrode current collector but also on at least a part of a positive electrode edge portion of the surface of the positive electrode current collector except the positive electrode tab portion. If the water repellent layer is provided on at least a part of the positive electrode edge portion as well, the effect of suppressing oxygen generation is enhanced. The water repellent layer is more preferably provided so as to reduce the area of the exposed portion of the positive electrode edge portion. The water repellent layer is more preferably provided so as to reduce the area of the exposed portion of the positive electrode tab portion.

The positive electrode active material-containing layer contains a positive electrode active material. As the positive electrode active material, materials allowing lithium ions to be inserted therein and extracted therefrom can be used. The positive electrode active material-containing layer may contain one type of positive electrode active material or two or more types of positive electrode active materials. Examples of the positive electrode active material are a lithium manganese composite oxide, a lithium nickel composite oxide, a lithium cobalt aluminum composite oxide, a lithium nickel cobalt manganese composite oxide, a spinel-type lithium manganese nickel composite oxide, a lithium manganese cobalt composite oxide, a lithium iron oxide, lithium fluorinated iron sulfate, and a phosphate compound (for example, $Li_xFePO_4$ ($0 \leq x \leq 1$) $Li_xMnPO_4$ ($0 \leq x \leq 1$)) having an olivine crystal structure. The phosphate compound having an olivine crystal structure has excellent thermal stability.

Examples of the positive electrode active material by which a high positive electrode potential is obtained will be described below. Examples thereof include $Li_xMn_2O_4$ ($0<x \leq 1$) having a spinel structure, a lithium manganese composite oxide (e.g., $Li_xMnO_2$ ($0<x\leq1$)), a lithium nickel aluminum composite oxide (e.g., $Li_xNi_{1-y}Al_yO_2$ ($0<x\leq1$, $0<y\leq1$)), a lithium cobalt composite oxide (e.g., $Li_xCoO_2$ ($0<x\leq1$), a lithium nickel cobalt composite oxide (e.g., $Li_xNi_{1-y-z}Co_yMn_zO_2$ ($0<x\leq1$, $0<y\leq1$, $0\leq z\leq1$), a lithium manganese cobalt composite oxide (e.g., $Li_xMn_yCo_{1-y}O_2$ ($0<x\leq1$, $0<y\leq1$), a spinel type lithium manganese nickel composite oxide (e.g., $Li_xMn_{2-y}Ni_yO_4$ ($0<x\leq1$, $0<y<2$)), a lithium phosphorus oxide having an olivine structure (e.g., $Li_xFePO_4$ ($0<x\leq1$), $Li_xFe_{1-y}Mn_yPO_4$ ($0<x\leq1$, $0\leq y\leq1$), $Li_xCoPO_4$ ($0<x\leq1$)), and a fluorinated iron sulfate (e.g., $Li_xFeSO_4F$ ($0<x\leq1$)).

The positive electrode active material is preferably at least one selected from the group consisting of a lithium cobalt composite oxide, a lithium manganese composite oxide, and a lithium phosphorus oxide having an olivine structure. The operating potential of each of the active materials is from 0.2 V (vs. $Li/Li^+$) to 0.8 V (vs. $Li/Li^+$), which is a high level. Further, the operating potential of each of the active materials exists near the equilibrium potential for oxygen evolution, thereby stably performing a charge/discharge cycle, which is preferred. These positive electrode active materials are used in combination with negative electrode active materials such as the spinel type lithium titanate and the anatase type titanium oxide so that a high battery voltage is obtained.

The positive electrode contains the positive electrode active material, for example, in the form of particles. The positive electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

If necessary, the conductive agent is added in order to improve the current collection performance and suppress the contact resistance of the active material to the current collector. Examples of the conductive agent include carbonaceous substances such as acetylene black, ketjen black, graphite, and coke. The conductive agent may be used singly, or in mixture of two or more kinds thereof.

Examples of the binder include polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), and polyacrylimide (PAI). The binder may be used singly, or in mixture of two or more kinds thereof.

As for the compounding ratio of the positive electrode active material, the conductive agent, and the binder in the positive electrode active material layer, it is preferable that the content of the positive electrode active material is from 80% by weight to 95% by weight, the content of the positive electrode conductive agent is from 3% by weight to 18% by weight, the content of the binder is from 2% by weight to 7% by weight. When the compounding ratio of the conductive agent is 3% by weight or more, the electrical conductivity of the positive electrode can be made favorable. When the compounding ratio of the conductive agent is 18% by weight or less, the decomposition of the electrolyte on the surface of the conductive agent can be reduced. When the compounding ratio of the binder is 2% by weight or more, sufficient electrode strength can be attained. When the compounding ratio of the binder is 7% by weight or more, the insulating part of the electrode can be reduced.

The positive electrode can be produced by, for example, the following method. First, the positive electrode active material, the conductive agent, and the binder are suspended in an appropriate solvent to prepare a slurry. The slurry is applied to one or both surfaces of a positive electrode current collector. A positive electrode active material-containing layer is formed by drying the coating on the positive electrode current collector. After that, the positive electrode current collector and the positive electrode active material-containing layer formed thereon are pressed. As the positive electrode active material-containing layer, a layer made of a positive electrode active material, a conductive agent, and a binder which are formed in pellets may be used.

(4) Positive Electrode Terminal

The positive electrode terminal can be electrically connected to the positive electrode current collector. Alternatively, the positive electrode terminal can be electrically connected to the positive electrode current collector via a positive electrode lead.

The positive electrode terminal is made of, for example, a material having a conductivity and an electrical stability representing that a potential to lithium standard potential is 3 V to 4.5 V (vs $Li/Li^+$). More specifically, aluminum or an aluminum alloy containing an element such as Mg, Ti, Zn, Mn, Fe, Cu, or Si is used. To reduce the contact resistance, the positive electrode terminal is preferably made of the same material as the positive electrode current collector.

(5) Aqueous Electrolyte

The aqueous electrolyte contains, for example, a solvent containing water and lithium salt or sodium salt as an electrolyte salt. The aqueous electrolyte is a solution containing, for example, lithium ions or sodium ions. The aqueous electrolyte may contain both lithium ions and sodium ions. The aqueous electrolyte may be a gel aqueous electrolyte formed by compositing the solution and a polymeric material. Examples of the polymeric material are polyvinylidene fluoride (PVdF), polyacrylonitrile (PAN), and polyethylene oxide (PEO).

The solvent containing water may be pure water or a solution mixture and/or a solvent mixture of water and a material other than water.

The aqueous electrolyte preferably contains 1 mol or more of solvent containing water with respect to 1 mol of electrolyte salt as a solute. The amount of the solvent containing water with respect to 1 mol of electrolyte salt is preferably 3.5 mol or more.

That the aqueous electrolyte contains water can be confirmed by GC-MS (Gas Chromatography-Mass Spectrometry). The salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. The numbers of moles of the solute and the solvent can be calculated by measuring the specific gravity of the aqueous electrolyte.

Examples of lithium salt include LiCl, LiBr, LiOH, $Li_2SO_4$, $LiNO_3$, LiTFSA (lithium trifluoromethanesulfonylamide), and $LiB[(OCO)_2]_2$. The lithium salt to be used may include one type or two or more types of lithium salts.

The lithium salt is preferably at least one salt selected from the group consisting of lithium chloride LiCl, lithium sulfate $Li_2SO_4$, and lithium nitrate $LiNO_3$. These lithium salts are inexpensive because of easy manufacture and allow a battery to be manufactured at low cost.

Examples of sodium salt include NaCl, $Na_2SO_4$, NaOH, $NaNO_3$, and NaTFSA (sodium trifluoromethanesulfonylamide). The sodium salt to be used may include one type or two or more types of sodium salts.

The aqueous electrolyte preferably contains zinc ions. This can improve the capacity of the secondary battery in addition to cycle life performance, storage performance, and large current discharge performance. This is assumed to be caused by a mechanism to be described below. Zinc ions in the electrolyte can be deposited by charge such as initial charge as zinc as a metal or a compound of zinc (for example, zinc oxide or zinc hydroxide) on the surfaces of particles of a titanium containing oxide that is the negative electrode active material. The deposited zinc or zinc compounds raises the hydrogen overvoltage of the negative electrode. As a result, hydrogen generation from the negative electrode can be suppressed.

The concentration of the zinc ions in the aqueous electrolyte is preferably 1 mg/L to 1000 mg/L. If the concentration of the zinc ions is too high, deposition of zinc conspicuously progresses, and the electrode peels off. Hence, the cycle life performance may lower. If the concentration of the zinc ions is too low, the deposition amount of zinc is small. Hence, the effect of suppressing hydrogen generation may manifest insufficiently.

The pH of the aqueous electrolyte can appropriately be changed, and is assumed to be preferably on the alkali side from the viewpoint of raising the hydrogen overvoltage. If the pH is on the alkali side, hydrogen generation can be suppressed more effectively. As a method of adjusting the pH of the aqueous solution, for example, LiOH is added. However, if pH exceeds 12, corrosion of the current collector undesirably progresses. The pH of the aqueous solution is preferably 2 to 11 and more preferably 3 to 9. If the pH falls within this range, the water repellent layer is hardly corroded and degraded by alkali. It is therefore possible to achieve excellent cycle life performance.

(6) Separator

A separator can be arranged between the positive electrode and the negative electrode. Examples of the separator include nonwoven fabric, a film, and paper. Examples of the material of the separator include a polyolefin such as polyethylene or polypropylene, and a cellulose. Preferable examples of the separator include nonwoven fabric containing cellulose fiber and a porous film containing polyolefin fiber.

As the separator, a solid electrolyte can also be used. The solid electrolyte is preferably an oxide such as LATP ($Li_{1+x}Al_xTi_{2-x}(PO_4)_3$) having a NASICON skeleton, LIPON ($Li_{2.9}PO_{3.3}N_{0.46}$) in an amorphous state, or garnet-type LLZ ($Li_7La_3Zr_2O_{12}$).

The porosity of the separator is preferably 60% or more. The fiber diameter is preferably 10 μm or less. When the fiber diameter is set to 10 μm or less, the affinity of the electrolyte with the separator is improved, thereby reducing the battery resistance. The fiber diameter is more preferably 3 μm or less. A cellulose fiber-containing non-woven fabric having a porosity of 60% or more has an excellent electrolyte impregnation property. Such a separator is used so that a high output performance can be exerted in a range of from low to high temperatures. Further, the non-woven fabric does not react with the negative electrode during long-term charge storage, float charge or over-charge, thereby causing no short circuit between the negative electrode and the positive electrode due to the formation of lithium metal dendrites. The porosity of the separator is more preferably from 62% to 80%.

It is preferable that the separator has a thickness of from 20 μm to 100 μm and a density of from 0.2 g/cm$^3$ to 0.9 g/cm$^3$. When the thickness and the density of the separator are within the above ranges respectively, the balance between the mechanical strength and a reduction in resistance of the battery can be adjusted, making it possible to provide a secondary battery which has a high output and is resistant to the development of internal short circuits. Also, a reduction in thermal shrinkage of the separator at high temperatures and a favorable high-temperature storage performance can be attained.

(7) Container

As the container that receives the positive electrode, negative electrode, and electrolyte, a metal container, a laminate film container or a resin container which is made of polyethylene or polypropylene may be used.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes. Further, the secondary battery may have a bipolar structure. As a result, a plural of cells connected in series can be produced by one cell, which is advantageous.

A secondary battery according to the embodiment will be described below with reference to FIGS. 1, 2, 3, 4, 5, 6, 7, 8, 9, 10, and 11.

Figure 2:
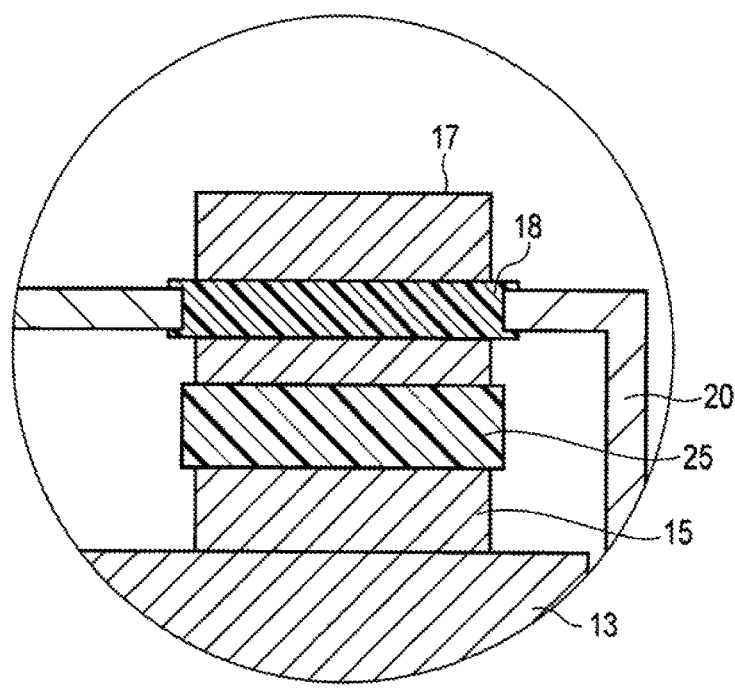
FIG. 2 is an enlarged sectional view showing a portion A in FIG. 1.
Figure 3:
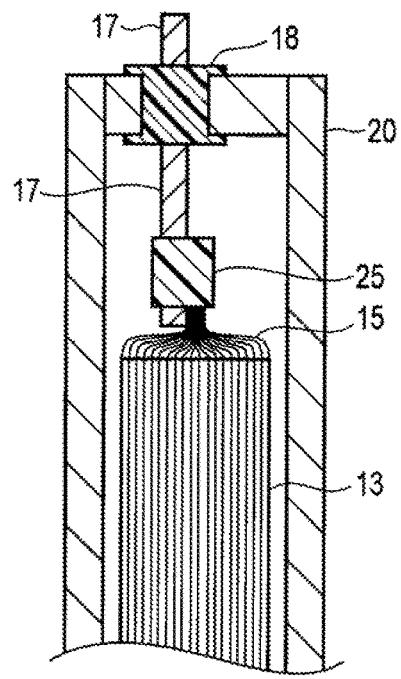
FIG. 3 is a sectional view of the rectangular secondary battery shown in FIG. 1 taken along a line III-III.
Figure 4:
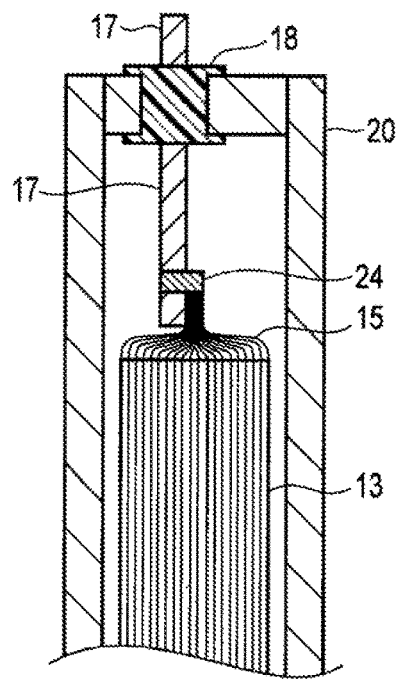
FIG. 4 is a sectional view schematically showing a part of a rectangular secondary battery according to a reference example.

FIG. 1 is a sectional view schematically showing an example of a rectangular secondary battery according to the embodiment. FIG. 2 is an enlarged sectional view showing a portion A in FIG. 1. FIG. 3 is a sectional view of the rectangular secondary battery shown in FIG. 1 taken along a line III-III. FIG. 4 is a sectional view schematically showing a part of a rectangular secondary battery according to a reference example. FIGS. 1 and 2 show a case in which the rectangular secondary battery according to the example is observed from a front. FIG. 3 shows a case in which the rectangular secondary battery according to the example is observed from a side.

A secondary battery 10 includes an electrode group 13, a positive electrode tab portion 14, a negative electrode tab portion 15, a positive electrode terminal 16, a negative electrode terminal 17, a gasket 18, a metal container 20, and a water repellent layer 25. The metal container 20 having a rectangular tubular shape stores the electrode group 13. The electrode group 13 has a structure in which, for example, a positive electrode and a negative electrode with a separator intervening therebetween are spirally wound to form a flat shape. Alternatively, the electrode group 13 has a structure in which plural of positive electrodes, plural of negative electrodes, and plural of separators are stacked in the order of positive electrode, separator, negative electrode, and separator. FIGS. 1, 2, and 3 show a case in which the electrode group 13 has the wound structure as an example. In any structure, the electrode group 13 preferably has a structure with a separator arranged on the outermost layer to avoid contact between the electrode and the metal container 20. The electrode group 13 holds an aqueous electrolyte (not shown).

As shown in FIGS. 1, 2, and 3, the negative electrode included in the electrode group 13 includes plural of negative electrode tab portions 15 projecting in a direction perpendicular to the long sides of a negative electrode current collector. The plural of negative electrode tab portions 15 are provided such that their positions overlap after the electrode group is wound. The positive electrode included in the electrode group 13 includes plural of positive electrode tab portions 14 projecting in a direction perpendicular to the long sides of a positive electrode current collector. The plural of positive electrode tab portions 14 are provided such that their positions overlap after the electrode group is wound.

The lid body of the metal container 20 includes an opening portion capable of passing the positive electrode terminal 16 and an opening portion capable of passing the negative electrode terminal 17. The positive electrode terminal 16 and the negative electrode terminal 17 are fixed to the opening portions via the gaskets 18 that are insulating members.

The plural of negative electrode tab portions 15 are bundled at their ends and joined to the negative electrode terminal 17. The whole surface of the joint is covered with the inner surface of the water repellent layer 25. If a part of the joint is exposed, the exposed portion undesirably contacts the aqueous electrolyte to readily cause hydrogen generation. The plural of positive electrode tab portions 14 and the positive electrode terminal 16 are joined, as in the negative electrode, and the whole surface of the joint is covered with the inner surface of the water repellent layer 25.

FIG. 4 is a schematic enlarged sectional view of the vicinity of the joint of a secondary battery without a water repellent layer. The plural of negative electrode tab portions 15 are bundled at their ends and joined to the negative electrode terminal 17. A joint 24 is formed by, for example, welding the negative electrode tab portions 15 and the negative electrode terminal 17. FIG. 3 shows an example of a state after the joint 24 shown in FIG. 4 is covered with the water repellent layer 25.

Figure 5:
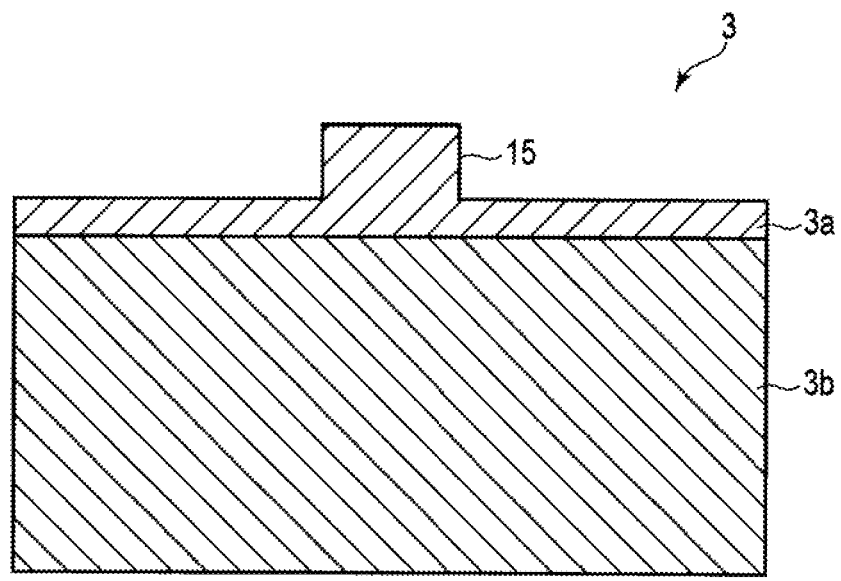
FIG. 5 is a plan view showing an example of a negative electrode according to the embodiment.
Figure 6:
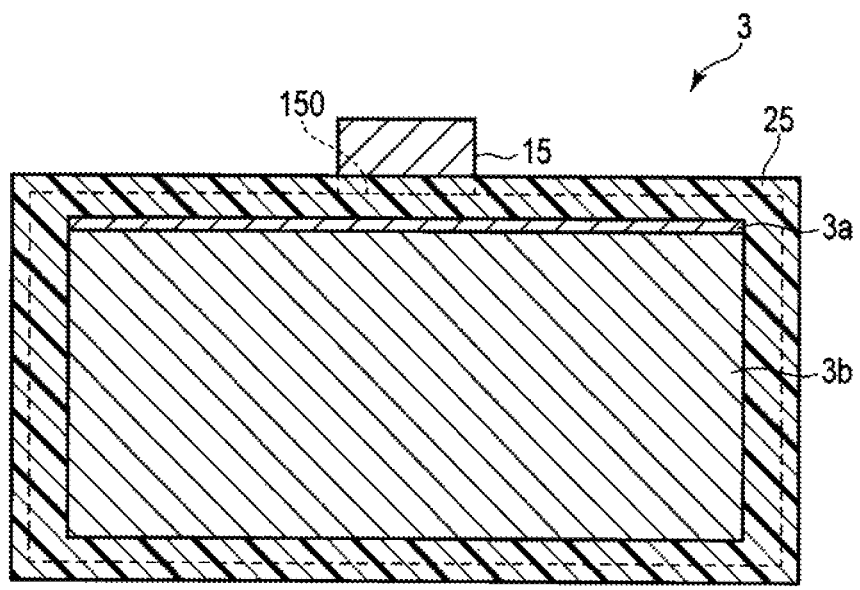
FIG. 6 is a plan view showing another example of the negative electrode according to the embodiment.

FIG. 5 is a plan view showing an example of a negative electrode according to the embodiment. FIG. 6 is a plan view showing another example of the negative electrode according to the embodiment.

As shown in FIG. 5, a negative electrode 3 includes, for example, a negative electrode current collector 3a and a negative electrode active material-containing layer 3b. The negative electrode active material-containing layer 3b is not provided at one end of the negative electrode current collector 3a parallel to the long-side direction. For example, as shown in FIG. 5, one end of the negative electrode current collector 3a with the negative electrode tab portions 15 is not provided with the negative electrode active material-containing layer 3b and is exposed. The one end is a negative electrode active material-containing layer nonforming portion where the negative electrode active material-containing layer 3b is not formed. The negative electrode tab portion 15 is a portion that projects from the one end of the negative electrode current collector 3a parallel to the long-side direction in parallel to the short-side direction of the negative electrode.

FIG. 6 is a plan view schematically showing a state in which the negative electrode shown in FIG. 5 further includes the water repellent layer 25. The water repellent layer 25 is provided, for example, on at least a part of a negative electrode edge portion of the surface of the negative electrode current collector 3a except the negative electrode tab portion 15.

In the negative electrode as an example shown in FIG. 6, the negative electrode edge portion is wholly covered with the inner surface of the water repellent layer 25. Additionally, in the negative electrode shown in FIG. 6, the water repellent layer 25 is provided to cover a boundary 150 between the negative electrode current collector 3a and the negative electrode tab portion 15. The boundary 150 is, for example, a line segment parallel to the long side of the negative electrode current collector 3a. As shown in FIG. 6, the water repellent layer 25 may be provided to cover a part of the negative electrode tab portion 15.

FIG. 7 shows a case in which a section of the secondary battery according to another example is observed from a side.

The electrode group 13 included in the secondary battery shown in FIG. 7 has a wound structure, as in the secondary battery shown in FIGS. 1, 2, and 3. However, a negative electrode current collector included in the secondary battery does not include a negative electrode tab portion. In addition, a positive electrode current collector included in the secondary battery does not include a positive electrode tab portion.

The negative electrode current collectors 3a are exposed to one section perpendicular to the winding axis of the electrode group 13, and no negative electrode active material-containing layer is provided on the exposed portion. The exposed portions of the negative electrode current collectors 3a are bundled by a clamp member 19, and the clamp member 19 and the negative electrode terminal 17 are joined by welding. The water repellent layer 25 is provided to cover the joint. The inner surface of the water repellent layer 25 covers the whole surface of the joint.

Although not illustrated, the positive electrode current collectors are exposed to another section perpendicular to the winding axis of the electrode group 13, and no positive electrode active material-containing layer is provided on the exposed portion. The exposed portions of the positive electrode current collectors are bundled by the clamp member 19, and the clamp member 19 and the positive electrode terminal 16 are joined by welding. The water repellent layer 25 is provided to cover the joint.

FIG. 8 shows a case in which a section of a secondary battery according to still another example is observed from a side.

The electrode group 13 included in the secondary battery shown in FIG. 8 has a wound structure, as in the secondary battery shown in FIGS. 1, 2, and 3. However, a negative electrode current collector included in the secondary battery does not include a negative electrode tab portion. Instead, the negative electrode current collector includes a negative electrode lead 27 configured to electrically connect the negative electrode current collector and the negative electrode terminal 17. In addition, a positive electrode current collector included in the secondary battery does not include a positive electrode tab portion. Instead, the positive electrode current collector includes a positive electrode lead configured to electrically connect the positive electrode current collector and the positive electrode terminal 16.

plural of negative electrode current collectors are exposed to one section perpendicular to the winding axis of the electrode group 13. Each negative electrode current collector and an end of the negative electrode lead 27 are joined by welding. Each of the joints is covered with the inner surface of the water repellent layer 25, as shown in FIG. 8.

The plural of negative electrode leads 27 are bundled on the other-end sides that are not joined to the negative electrode current collectors, and joined to the negative electrode terminal 17 by welding. The water repellent layer 25 is provided to cover the joint.

Figure 9:
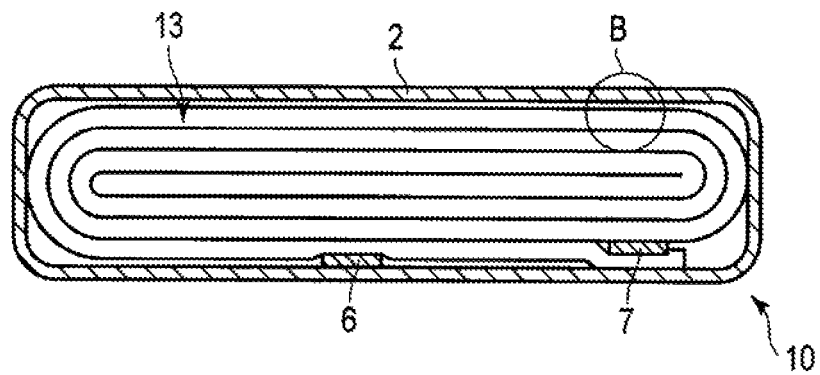
FIG. 9 is a sectional view schematically showing another example of the secondary battery according to the embodiment.
Figure 10:
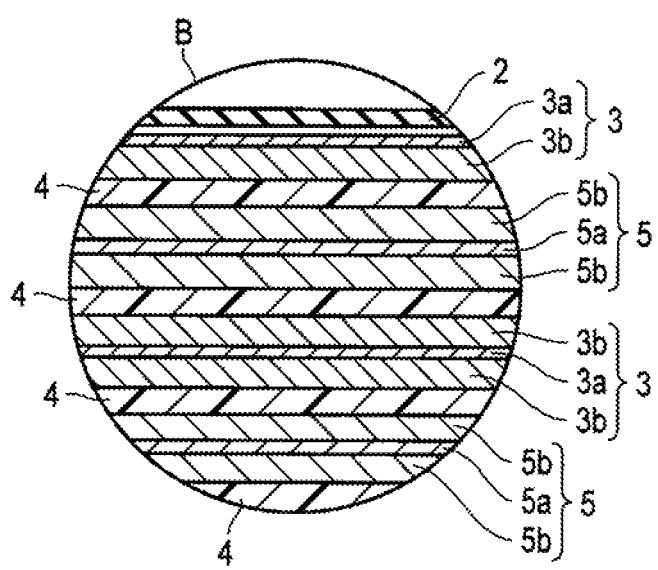
FIG. 10 is an enlarged sectional view showing a portion B in FIG. 9.

FIG. 9 is a sectional view schematically showing another example of the secondary battery. FIG. 10 is an enlarged sectional view showing a portion B in FIG. 9. The secondary battery 10 shown in FIGS. 9 and 10 includes a flat wound electrode group 13.

As shown in FIG. 10, the wound electrode group 13 includes the negative electrode 3, a separator 4, and a positive electrode 5. The separator 4 intervenes between the negative electrode 3 and the positive electrode 5. A stacked structure is formed by stacking the negative electrode 3, the separator 4, and the positive electrode 5. The stacked structure is spirally wound with the negative electrode 3 facing outward, as shown in FIG. 10, and pressed, thereby forming the flat wound electrode group 13. The stacked structure is formed such that the separator 4 intervenes between the negative electrode 3 and the positive electrode 5.

The negative electrode 3 includes the negative electrode current collector 3a and the negative electrode active material-containing layer 3b. The outermost negative electrode 3 has a structure in which the negative electrode active material-containing layer 3b is formed only on one inner-side surface of the negative electrode current collector 3a, as shown in FIG. 10. In each of the remaining negative electrodes 3, the negative electrode active material-containing layer 3b is formed on both surfaces of the negative electrode current collector 3a.

In the positive electrode 5, a positive electrode active material-containing layer 5b is formed on both surfaces of a positive electrode current collector 5a.

As shown in FIGS. 9 and 10, near the outer end of the wound electrode group 13, a negative electrode terminal 6 is connected to the negative electrode current collector 3a of the outermost negative electrode 3, and a positive electrode terminal 7 is connected to the positive electrode current collector 5a of the positive electrode 5 on the inner side. Although not illustrated, a water repellent layer is provided on the whole surface of the joint between the negative electrode terminal 6 and the negative electrode current collector 3a. Although not illustrated, a water repellent layer is provided on the whole surface of the joint between the positive electrode terminal 7 and the positive electrode current collector 5a.

The wound electrode group 13 is stored in a sack-shaped container 2 made of a laminated film with a metal layer intervening between two resin layers.

The negative electrode terminal 6 and the positive electrode terminal 7 extend outward from opening portions of the sack-shaped container 2. For example, the aqueous electrolyte is injected from the opening portion of the sack-shaped container 2 and stored in the sack-shaped container 2.

The opening portion of the sack-shaped container 2 is heat-sealed while sandwiching the negative electrode terminal 6 and the positive electrode terminal 7, thereby completely sealing the wound electrode group 13 and the aqueous electrolyte.

A battery module may be formed of the secondary batteries according to the embodiment.

Examples of the battery module include those including a plural of single batteries electrically connected in series, in parallel, or in a combination of in series and in parallel; a unit constituted of a plural of single batteries electrically connected in series; those including a unit constituted of a plural of single batteries electrically connected in parallel; and a unit constituted of plural of single batteries electrically connected in a combination of in series and in parallel.

The battery module may be received in a cabinet. As the cabinet, a metal can which is made of an aluminum alloy, iron or stainless steel or a plastic container may be used. The thickness of the container is preferably 0.5 mm or more.

Examples of the form of serial or parallel electrical connection of a plural of secondary batteries include serial or parallel electrical connection of a plural of secondary batteries each having a container, and serial or parallel electrical connection of a plural of secondary electrode groups received in a common cabinet. According to a specific example of the former, a plural of secondary batteries whose positive and negative electrode terminals are connected by a metal bus bar (e.g., aluminum, nickel, copper). According to a specific example of the latter, a plural of electrode groups are received in one cabinet with electrochemically insulated by a diaphragm, and these electrode groups are electrically connected in series. Five to seven batteries are electrically connected in series so that a battery module having favorable voltage compatibility with the lead storage battery can be realized. In order to increase the voltage compatibility with the lead storage battery, it is preferable that five or six single batteries are configured to be connected in series.

An example of a battery module will be described with reference to FIG. 11.

Figure 11:
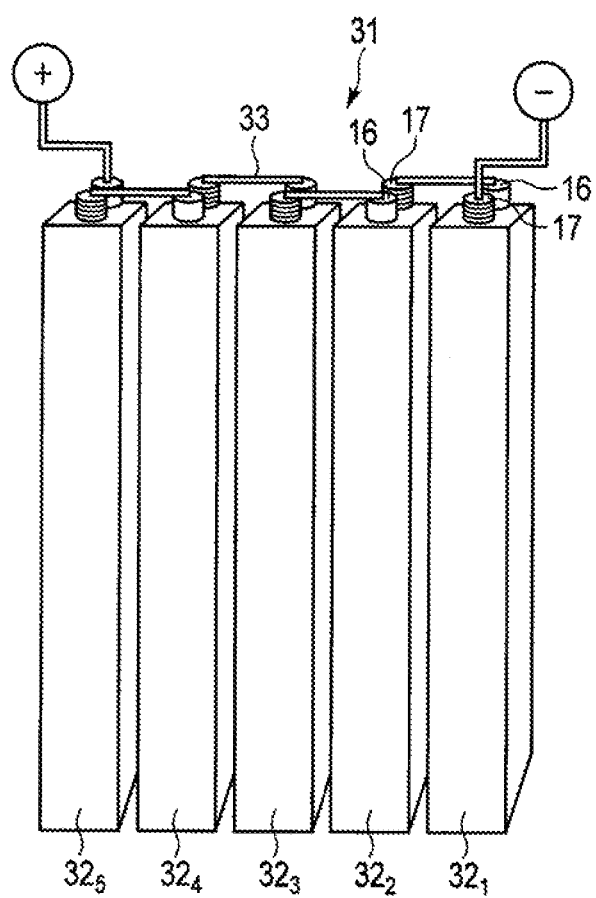
FIG. 11 is a perspective view schematically showing an example of a battery module according to the embodiment.

FIG. 11 is a perspective view schematically showing an example of a battery module including, as single batteries, plural of rectangular secondary batteries according to the embodiment. A battery module 31 includes plural of rectangular secondary batteries (for example, the secondary batteries described with reference to FIGS. 1, 2, and 3) $32_1$ to $32_5$. The positive electrode terminal 16 of the battery $32_1$ and the negative electrode terminal 17 of the battery $32_2$ located adjacent to the battery $32_1$ are electrically connected by a lead 33. In addition, the positive electrode terminal 16 of the battery $32_2$ and the negative electrode terminal 17 of the battery $32_3$ located adjacent to the battery $32_2$ are electrically connected by the lead 33. The batteries $32_1$ to $32_5$ are thus electrically connected in series.

Note that if five secondary batteries according to the embodiment are connected in series, satisfactory compatibility with a lead storage battery can be obtained. For this reason, the battery module including five secondary batteries connected in series can be used as a power supply alternative to a lead storage battery.

The secondary battery according to the first embodiment is a secondary battery including a negative electrode including a negative electrode current collector, a negative electrode terminal electrically connected to the negative electrode current collector, a joint electrically connecting the negative electrode terminal and the negative electrode current collector, a water repellent layer covering the joint, a positive electrode, and an aqueous electrolyte containing at least one of lithium salt and sodium salt. Each of the negative electrode terminal and the negative electrode current collector includes zinc or an alloy containing zinc, or the negative electrode includes a coating layer containing boehmite in at least a part of a surface of each of the negative electrode terminal and the negative electrode current collector. The joint is covered with the inner surface of the water repellent layer. A contact angle θ with respect to water on an outer surface of the water repellent layer satisfies 80°≤θ. For this reason, since the joint configured to electrically connect the negative electrode terminal and the negative electrode current collector does not come into direct contact with the aqueous electrolyte, hydrogen generation in the negative electrode can be suppressed. As a result, a secondary battery capable of achieving excellent cycle life performance can be obtained.

Second Embodiment

According to a second embodiment, a battery pack is provided. The battery pack includes the secondary battery according to the first embodiment.

The battery pack may include one or a plural of the secondary batteries (single batteries) according to the first embodiment as described above. The secondary batteries included in the battery pack may be electrically connected in series, in parallel, or in a combination of in series and in parallel.

The battery pack may further include a protective circuit. The protective circuit controls charge/discharge of the secondary battery. Alternatively, a circuit included in a device using as the battery pack as a power source (e.g., an electronic device or an automobile) may be used as the protective circuit of the battery pack.

Further, the battery pack may further include an external power distribution terminal. The external power distribution terminal outputs a current from the secondary battery to outside and inputs a current to the secondary battery. In other words, when the battery pack is used as a power source, the current is supplied to the outside through the external power distribution terminal. When charging the battery pack, charging current (including a regenerative energy caused by, for example, power of automobile) is supplied to the battery pack through the external power distribution terminal.

Figure 13:
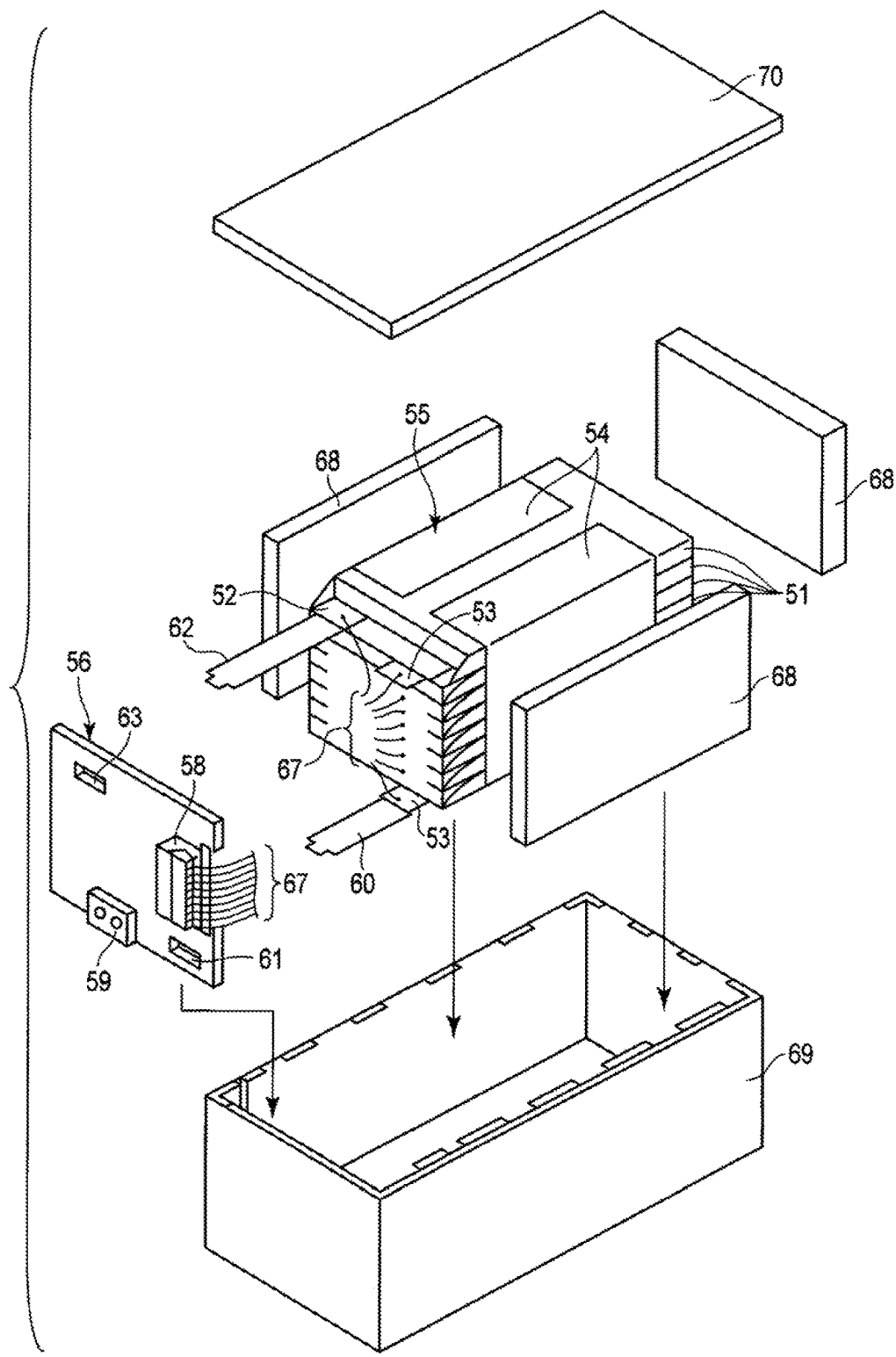
FIG. 13 is an exploded perspective view schematically showing an example of a battery pack according to the embodiment.
Figure 14:
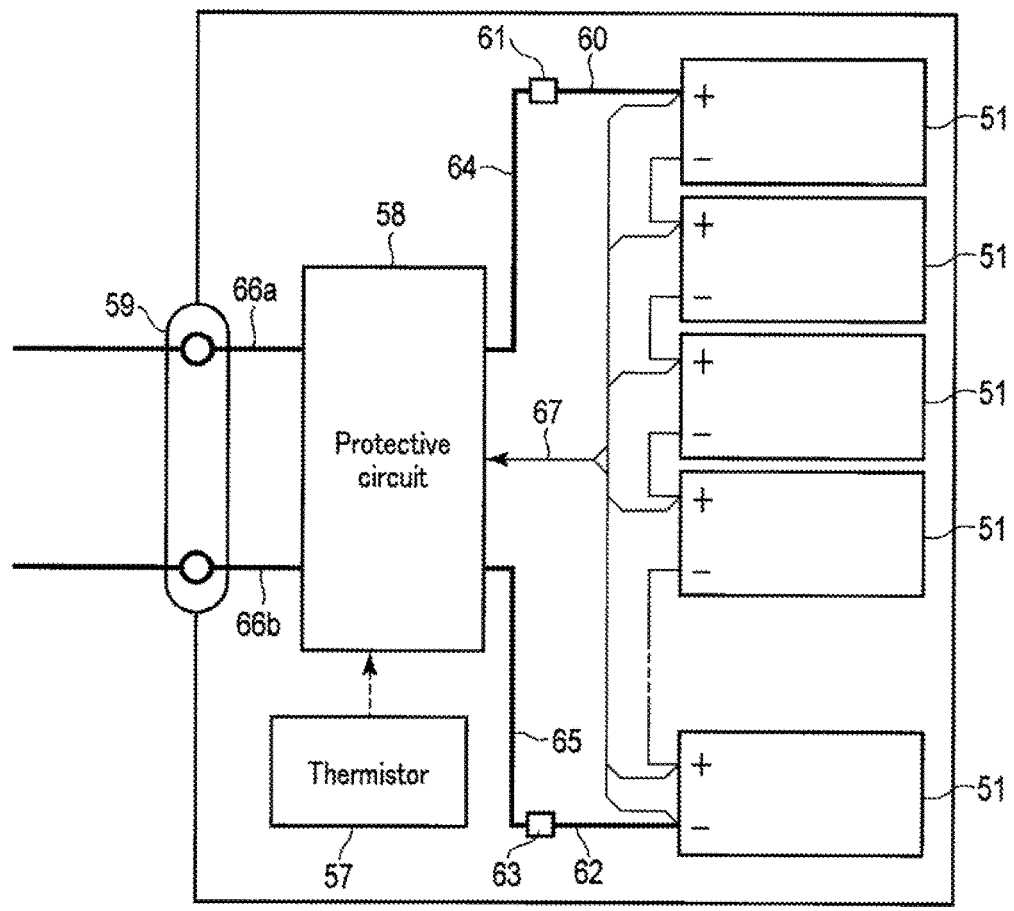
FIG. 14 is a block diagram showing the electric circuit of the battery pack shown in FIG. 12.

An example of the battery pack according to the embodiment will be described in detail with reference to FIGS. 13 and 14. FIG. 13 is an exploded perspective view of a battery pack. FIG. 14 is a block diagram showing an electric circuit of the battery pack of FIG. 13.

Plural of single batteries 51 constituted of flat-shaped lithium secondary batteries is stacked in such a manner that a negative electrode terminal 52 and a positive electrode terminal 53 extending out are oriented in the same direction, and bound by an adhesive tape 54 to form a battery module 55. As shown in FIG. 14, the single batteries 51 are electrically connected in series with each other.

A printed wiring board 56 is disposed opposing to the side surface of the single batteries 51 from which the negative electrode terminal 52 and the positive electrode terminal 53 are extended. As shown in FIG. 14, a thermistor 57, a protective circuit 58, and an external power distribution terminal 59 are mounted on the printed wiring board 56. Incidentally, an insulating plate (not shown) is attached to the surface of the printed wiring board 56 which faces the battery module 55, thereby avoiding unnecessary connection of the wiring line of the battery module 55 with the printed wiring board 56.

A positive electrode lead 60 is connected to the positive electrode terminal 53 which is located at the undermost layer of the battery module 55, and its tip is inserted to and electrically connected to a positive electrode connector 61 of the printed wiring board 56. A negative electrode lead 62 is connected to the negative electrode terminal 52 which is located at the uppermost layer of the battery module 55, and its tip is inserted to and electrically connected to a negative electrode connector 63 of the printed wiring board 56. These connectors 61 and 63 are connected to the protective circuit 58 via wiring lines 64 and 65 that are formed on the printed wiring board 56.

The thermistor 57 detects the temperature of each of the single batteries 51 and sends the detection signal to the protective circuit 58. The protective circuit 58 can shut down a plus wiring line 66a and a minus wiring line 66b between the protective circuit 58 and the external power distribution terminal 59 under a predetermined condition. The predetermined condition refers to, for example, the time at which the temperature detected by the thermistor 57 reaches a predetermined temperature or more. Further, the predetermined condition, refers to the time at which over-charge, over-discharge, and over-current of the single batteries 51 are detected. The over-charge detection is performed on each of the single batteries 51 or the battery module 55. In the case where each of the single batteries 51 is detected, the battery voltage may be detected or the positive electrode potential or the negative electrode potential may be detected. In the case of the latter, a lithium electrode to be used as a reference electrode is inserted into each of the single batteries 51. In the case of FIGS. 13 and 14, wiring lines 67 for voltage detection are connected to the single batteries 51 and detection signals are sent to the protective circuit 58 through the wiring lines 67.

Protective sheets 68 made of rubber or resin are formed on three side surfaces of the battery module 55 except for the side face from which the positive electrode terminal 53 and the negative electrode terminal 52 protrude.

The battery module 55 is received in a receiving container 69 together with each of the protective sheet 68 and the printed wiring board 56. In other words, the protective sheets 68 are disposed on both inner surfaces in a long side direction and one of the inner surfaces in a short side direction of the receiving container 69, and the printed wiring board 56 is disposed on the other inner surface in a short side direction. The battery module 55 is located in a space surrounded by the protective sheets 68 and the printed wiring board 56. A lid 70 is attached to the top of the receiving container 69.

In order to fix the battery module 55, a heat-shrinkable tape may be used in place of the adhesive tape 54. In this case, the battery module 55 is bound by placing the protective sheets on both side surfaces of the battery module 55, winding the heat-shrinkable tape and two protective sheets around the battery module 55, and thermally shrinking the heat-shrinkable tape.

FIGS. 13 and 14 show a form in which the single batteries 51 are connected in series. As described above, the single batteries may be connected in parallel in order to increase the battery capacity. Alternatively, the single batteries may be connected in a combination of in series and in parallel. The assembled battery pack may be connected in series or in parallel.

The form of the battery pack is appropriately changed in accordance with the application purpose. As for the application purpose of the battery pack, a battery pack required to be capable of charge and discharge of a large current is preferable. More specifically, the battery pack is used as, for example, a power supply for a digital camera, an onboard battery for vehicles such as a two to four-wheeled hybrid electronic automobile, a two to four-wheeled electronic automobile, and an electric bicycle, a stationary battery, or a battery for a rail way car. In particular, the battery pack is suitably used as an onboard battery.

In a vehicle such as an automobile in which the battery pack according to this embodiment is mounted, the battery pack is configured to recover, for example, a regenerative energy of the motive force of the vehicle.

The above-described battery pack according to the second embodiment includes the secondary battery according to the first embodiment, and can therefore achieve excellent cycle life performance. Additionally, according to the second embodiment, it is possible to provide a battery pack suitable as a power supply alternative to a lead storage battery that is used as a starter power supply for a vehicle, or as an onboard secondary battery mounted in a hybrid car.

Third Embodiment

According to the third embodiment, a vehicle is provided. The vehicle includes the battery pack according to the second embodiment.

Examples of the vehicle include a two to four-wheeled hybrid electronic automobile, a two to four-wheeled electronic automobile, an electric bicycle, and an electric train.

Figure 15:
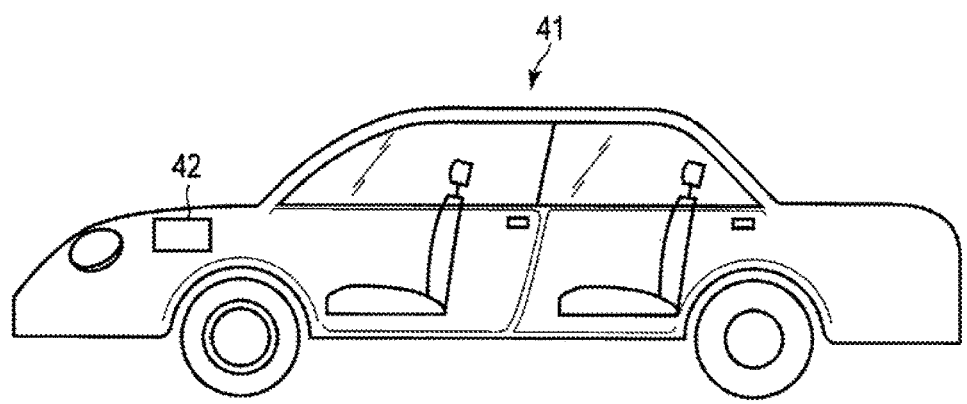
FIG. 15 is a sectional view schematically showing an example of a vehicle according to the embodiment.

FIG. 15 shows an example of a vehicle which includes the battery pack according to the second embodiment.

An automobile 41 shown in FIG. 15 has a battery pack 42 mounted in an engine room in front of a vehicle body. The location where the battery pack is mounted in the automobile is not limited to the engine room. For example, the battery pack may be mounted at the rear side of the vehicle body of the automobile or under the seat.

The arrangement of a mode of a vehicle including a secondary battery according to the embodiment will be described below with reference to FIG. 16.

FIG. 16 is a view schematically showing the arrangement of a mode of a vehicle in which the secondary battery according to the embodiment is mounted. A vehicle 300 shown in FIG. 16 is an electric automobile.

The vehicle 300 shown in FIG. 16 includes a vehicle power supply 301, a vehicle ECU (Electric Control Unit) 380 serving as the host control means of the vehicle power supply 301, an external terminal (a terminal used to connect an external power supply) 370, an inverter 340, and a drive motor 345.

In the vehicle 300, the vehicle power supply 301 is mounted, for example, in an engine room, on the rear side of the vehicle body of the automobile, or under a seat. However, FIG. 16 schematically shows the mount position of the secondary battery in the vehicle 300.

The vehicle power supply 301 includes plural of (for example, three) battery packs 312a, 312b, and 312c, a BMU (Battery Management Unit) 311, and a communication bus 310.

The three battery packs 312a, 312b, and 312c are electrically connected in series. The battery pack 312a includes a battery module 314a and a battery module monitoring unit (For example, VTM: Voltage Temperature Monitoring) 313a. The battery pack 312b includes a battery module 314b and a battery module monitoring unit 313b. The battery pack 312c includes a battery module 314c and a battery module monitoring unit 313c. The battery packs 312a, 312b, and 312c can independently be detached and exchanged with another battery pack.

Each of the battery modules 314a to 314c includes plural of secondary batteries connected in series. Each secondary battery is, for example, the secondary battery according to the first embodiment. Each of the battery modules 314a to 314c performs charge and discharge via a positive electrode terminal 316 and a negative electrode terminal 317.

To collect information about the maintenance of the vehicle power supply 301, the BMU 311 communicates with the battery module monitoring units 313a to 313c and collects information of the voltages and temperatures of the secondary batteries of the battery modules 314a to 314c included in the vehicle power supply 301.

The communication bus 310 is connected between the BMU 311 and the battery module monitoring units 313a to 313c. The communication bus 310 is configured to cause a plurality of nodes (the BMU and at least one battery module monitoring unit) to share a set of communication lines. The communication bus 310 is a communication bus configured based on, for example, the CAN (Control Area Network) standard.

The battery module monitoring units 313a to 313c measure the voltage and temperature of the individual secondary batteries of the battery modules 314a to 314c based on a command from the BMU 311 by communication. The temperature can be measured at several points per battery module, and it is unnecessary to measure the temperatures of all secondary batteries.

The vehicle power supply 301 can also include an electromagnetic contactor (for example, a switch device 333 shown in FIG. 16) configured to connect/disconnect the positive electrode terminal and the negative electrode terminal. The switch device 333 includes a precharge switch (not shown) to be turned on when charging the battery modules 314a to 314c, and a main switch (not shown) to be turned on when supplying a battery output to a load. Each of the precharge switch and the main switch includes a relay circuit (not shown) that is turned on/off by a signal supplied to a coil arranged near the switch element.

The inverter 340 converts an input DC voltage into a three-phase AC high voltage to drive a motor. The output voltage of the inverter 340 is controlled based on a control signal from the BMU 311 (to be described later) or the vehicle ECU 380 configured to control the entire operation of the vehicle. The three-phase output terminals of the inverter 340 are connected to the three-phase input terminals of the drive motor 345.

The drive motor 345 is rotated by power supplied from the inverter 340 and transmits the rotation to the axle shafts and driving wheels W via, for example, a differential gear unit.

Although not illustrated, the vehicle 300 includes a regeneration brake mechanism that rotates the drive motor 345 when braking the vehicle 300 and converts the kinetic energy into regenerative energy as electric energy. The regenerative energy recovered by the regeneration brake mechanism is input to the inverter 340 and converted into a DC current. The DC current is input to the vehicle power supply 301.

One terminal of a connection line L1 is connected to the negative electrode terminal 317 of the vehicle power supply 301. The connection line L1 is connected to the negative electrode input terminal of the inverter 340 via a current detection unit (not shown) in the BMU 311.

One terminal of a connection line L2 is connected to the positive electrode terminal 316 of the vehicle power supply 301 via the switch device 333. The other terminal of the connection line L2 is connected to the positive electrode input terminal of the inverter 340.

The external terminal 370 is connected to the BMU 311. The external terminal 370 can be connected to, for example, an external power supply.

The vehicle ECU 380 manages the whole vehicle by controlling the BMU 311 in cooperation with other devices in response to an operation input of the driver or the like.

Data concerning the maintenance of the vehicle power supply 301 such as the remaining capacity of the vehicle power supply 301 is transferred between the BMU 311 and the vehicle ECU 380 via a communication line.

In the vehicle including the secondary battery according to the embodiment, each of the battery packs 312a, 312b, and 312c can achieve excellent cycle life performance. Hence, according to the embodiment, it is possible to provide a vehicle in which a battery pack capable of achieving excellent cycle life performance is mounted.

EXAMPLES

Examples will be described below. The embodiments are not limited to the examples to be described below.

Example 1

A secondary battery was produced as will be described below.

(Production of Negative Electrode)

Lithium titanate $Li_4Ti_5O_{12}$ was used as a negative electrode active material, graphite was used as a conductive agent, and PTFE was used as a binder. As for the composition of these in the negative electrode active material-containing layer, the weight ratio was negative electrode active material:conductive agent:binder=100:20:10. The powders were put in an N-methyl-2-pyrrolidone solvent, mixed, and stirred to produce a slurry. A negative electrode current collector including a coating layer made of boehmite formed on the whole surface of an aluminum current collector with a purity of 99.85% was prepared. The produced slurry was applied to both surfaces of the negative electrode current collector. The solvent was dried, and the current collector was rolled to form a negative electrode. The electrode weight per unit area was 20 $g/m^2$.

(Production of Positive Electrode)

Lithium manganate $LiMn_2O_4$ was used as a positive electrode active material, acetylene black was used as a conductive agent, and PVdF was used as a binder. As for the composition of these in the positive electrode active material-containing layer, the weight ratio was positive electrode active material:conductive agent:binder=100:10:10. The powders were put in an N-methyl-2-pyrrolidone solution, mixed, and stirred to produce a slurry. The slurry was applied to both surfaces of a current collector made of titanium. The solvent was dried, and the current collector was rolled to form a positive electrode. The electrode weight per unit area was adjusted such that the positive electrode/negative electrode capacity ratio became 1.5.

(Production of Lid Body with Terminals Attached)

A lid body made of polystyrene was prepared, and holes to pass a negative electrode terminal and a positive electrode terminal were formed in the lid body.

As the negative electrode terminal, aluminum including a coating layer (thickness: 500 nm) made of boehmite on a surface and having a purity of 99.85% was prepared. The size of the negative electrode terminal was 25 mm×50 mm×0.5 mm. The negative electrode terminal was inserted into the opening of the lid body, and the gap between the lid body and the negative electrode terminal was filled with an epoxy adhesive to bond them.

As the positive electrode terminal, titanium having a purity of 99.4% was prepared. The size of the positive electrode terminal was 25 mm×50 mm×0.5 mm, like the negative electrode terminal. The positive electrode terminal was inserted into the opening of the lid body, and the gap between the lid body and the positive electrode terminal was filled with an epoxy adhesive to bond them.

(Preparation of Wound Electrode Group)

Each of the negative electrode and the positive electrode which were produced in advance was cut using a slitter such that the current collector had a width of 10.5 cm in the short-side direction, and the active material-containing layer had a width of 10 cm in the same direction as the short-side direction. When cutting, plural of tab portions were provided on each of the negative electrode and the positive electrode. Each of the negative electrode current collector and the positive electrode current collector included an exposed portion having a width of 0.5 cm on a side with the tab portion. Each of the plural of tab portions had a size of 25 mm in the long-side direction of the current collector and 15 mm in the short-side direction. The interval between the plural of tab portions was set such that the plural of positive electrode tab portions overlapped each other, and the plural of negative electrode tab portions overlapped each other after the electrodes were wound. The thus prepared negative electrode and positive electrode and a cellulose separator to intervene between them were wound using a winder, thereby producing a wound electrode group in which the plural of positive electrode tab portions and the plural of negative electrode tab portions projected from one side surface of the electrode group after the winding.

(Welding of Terminals and Tab Portions, and Producing of Water Repellent Layer)

The positive electrode terminal bonded to the lid body and the plural of positive electrode tab portions projecting from one side surface of the wound electrode group were welded. More specifically, the plural of positive electrode tab portions and the positive electrode terminal were overlaid, and ultrasonic welding was performed using an ultrasonic welding machine. The plural of negative electrode tab portions and the negative electrode terminal were also welded in the same way. An electrode group-lid body assembly was thus produced.

After the welding, a water repellent layer made of polyimide was bonded so as to cover the whole surface of the joint formed by the ultrasonic welding between the positive electrode terminal and the positive electrode tab portions. Similarly, a water repellent layer was bonded so as to cover the whole surface of the joint between the negative electrode terminal and the negative electrode tab portions. The used water repellent layer was a water repellent tape having silicone as an adhesive material on one surface of the water repellent layer. The water repellent layer was provided from each of the terminal side and the tab portion side so as to overlap and wind the entire joint. At this time, the water repellent layer was provided without forming any wrinkle even in the thickness direction of the joint. The thickness of the water repellent layer was 500 μm.

On a surface of the water repellent layer which did not face the joint of each electrode, the contact angle with respect to water was measured by the method described in the embodiment and found to be 80°.

(Insertion into Container)

The electrode group-lid body assembly with the water repellent layer provided on each joint was inserted into a rectangular container made of polystyrene, and an aqueous electrolyte was injected. As the aqueous electrolyte, an aqueous solution prepared by dissolving minute amounts of metallic zinc in an aqueous solution containing LiCl salt at a concentration of 12 M was used. The concentration of the zinc ions in the aqueous solution was 1.6 mg/L. The gap between the rectangular container and the lid body was filled using an epoxy adhesive, thereby producing a secondary battery.

Example 2

A secondary battery was produced in accordance with the same procedure as that described in Example 1 except that a water repellent layer made of polytetrafluoroethylene (PTFE) was used.

Example 3

A secondary battery was produced in accordance with the same procedure as that described in Example 1 except that a water repellent layer made of tetrafluoroethylene-hexafluoropropylene copolymer (FEP) was used.

Example 4

When producing the wound electrode group, a water repellent tape having silicone as an adhesive material on one surface of the water repellent layer made of polyimide was bonded so as to cover the edge portion of the cut negative electrode current collector before the winding. More specifically, of the water repellent tape having a width of 10 mm, a 7-mm wide portion was bonded to one surface of the negative electrode current collector, such that the remaining 3-mm wide portion projected outward from each side of the negative electrode current collector. The water repellent tape was similarly bonded to the other surface of the negative electrode current collector. The projecting adhesive faces of the water repellent tapes were bonded to each other, thereby producing a negative electrode with the water repellent layer provided on the negative electrode edge portion. Note that the water repellent tapes were bonded without forming any wrinkle.

A secondary battery was produced in accordance with the same procedure as that described in Example 1 except that the negative electrode with the water repellent layer provided on the negative electrode edge portion was used.

Example 5

A secondary battery was produced in accordance with the same procedure as that described in Example 1 except that the following arrangement.

After the negative electrode tab portions and the negative electrode terminal were joined by welding, the joint was immersed in acetone to do degreasing and cleaning. Next, a coating material prepared by mixing an epoxy resin solvent and PTFE powder was applied to cover the joint and dried at 120° C. After that, application was performed for the second time using a coating material prepared by dispersing only PTFE resin powder in N-methyl-2-pyrrolidone, and the coating material was dried at 120°.

The PTFE resin powder thus provided to cover the joint was pressed and fused using a forming jig heated to 400°, thereby forming a water repellent layer covering the surface of the joint. The thickness of the water repellent layer was 400 μm. A water repellent layer was provided on the joint between the positive electrode tab portions and the positive electrode terminal as well, like the joint of the negative electrode.

Example 6

A secondary battery was produced in accordance with the same procedure as that described in Example 1 except that the following arrangement.

As the negative electrode current collector, a current collector made of metallic zinc having a purity of 99.9% was used. The negative electrode terminal and the negative electrode tab portions are clamped by a clamp member made of aluminum and including a coating layer made of boehmite on the surface and contact-bonded by applying a pressure. The water repellent layer was provided from each of the terminal side and the clamp member side so as to wind the entire joint at which the negative electrode terminal and the clamp member were contact-bonded. At this time, the water repellent layer was provided without forming any wrinkle even in the thickness direction of the contact-bonded portion.

Example 7

A secondary battery was produced in accordance with the same procedure as that described in Example 1 except that a positive electrode lead and a negative electrode lead were used instead of providing a positive electrode tab portion and a negative electrode tab portion.

More specifically, a negative electrode lead having a size of 25 mm×50 mm×0.2 mm was welded to the position of the negative electrode tab portion provided on the negative electrode current collector of Example 1. As the negative electrode lead, aluminum (purity 99.85%) including a coating layer made of boehmite on its surface, and having a thickness of 500 nm was used. In addition, a positive electrode lead having a size of 25 mm×50 mm×0.2 mm was welded to the position of the positive electrode tab portion provided on the positive electrode current collector of Example 1. As the positive electrode lead, a lead made of Ti was used. The welding of the leads was performed before production of the wound electrode group.

A water repellent layer (water repellent tape) made of polyimide was bonded to the joint where the negative electrode lead and the negative electrode current collector were welded so as to cover the whole joint. Joining of the negative electrode lead and the negative electrode terminal was performed in accordance with the same procedure as that described in Example 1. A water repellent layer was provided on the joint in accordance with the same procedure as that described in Example 1.

Welding of the positive electrode lead and the positive electrode current collector, welding of the positive electrode lead and the positive electrode terminal, and formation of water repellent layers on the joints were performed as in the negative electrode.

Example 8

A secondary battery was produced in accordance with the same procedure as that described in Example 1 except that anatase-type titanium oxide $TiO_2$ was used as the negative electrode active material.

Example 9

A secondary battery was produced in accordance with the same procedure as that described in Example 1 except that lithium cobalt oxide $LiCoO_2$ was used as the positive electrode active material.

Example 10

A secondary battery was produced in accordance with the same procedure as that described in Example 1 except that lithium iron phosphate $LiFePO_4$ was used as the positive electrode active material.

Example 11

Plural of positive electrodes and plural of negative electrodes produced in accordance with the same procedure as in Example 1 were die-cut by a punching machine using a Thompson blade such that the active material-containing layers had sizes of 60 mm×90 mm and 61 mm×91 mm, respectively. Each of positive electrode current collectors and negative electrode current collectors was provided with a tab portion having a size of 10 mm in the long-side direction of the current collector and 10 mm in the short-side direction of the current collector. Additionally, as described in Example 4, a water repellent layer made of polyimide was provided on the edge portion of the negative electrode current collector.

The cut positive electrodes and negative electrodes were alternately stacked while inserting a zigzag-folded 30-μm thick cellulose separator between them so as not to bring them into contact, thereby producing an electrode stacked body. A stacked body having a stack structure in which plural of positive electrode tab portions and plural of negative electrode tab portions were provided on one section of the stacked body was produced in this way. The lid body was produced in accordance with the same procedure as in Example 1 except that the size of the positive electrode terminal and the negative electrode terminal was changed to 10 mm×50 mm×0.5 mm.

The plural of negative electrode tab portions were bundled by a clamp member, and the clamp member and the negative electrode terminal were welded by ultrasonic welding. In addition, the plural of positive electrode tab portions were bundled by a clamp member, and the clamp member and the positive electrode terminal were welded by ultrasonic welding. As the clamp member, a clamp member made of aluminum and including a coating layer made of boehmite on the surface was used.

The step from water repellent layer formation to insertion into the container member was performed as in Example 1, thereby producing a secondary battery.

Example 12

A secondary battery was produced as in Example 1 except that neither a positive electrode tab portion nor a negative electrode tab portion was provided.

However, on one section perpendicular to the winding axis of the wound electrode group, a portion of a negative electrode current collector where no negative electrode active material-containing layer was provided was exposed in 7 mm in the winding axis direction. On another section perpendicular to the winding axis of the wound electrode group, a portion of a positive electrode current collector where no positive electrode active material-containing layer was provided was exposed in 7 mm in the winding axis direction.

The exposed portion of each electrode was clamped by a clamp member made of aluminum and including a coating layer made of boehmite on the surface, and the clamp members and the terminals of the electrodes were welded by ultrasonic welding.

Comparative Example 1

A secondary battery was produced in accordance with the same procedure as that described in Example 1 except that neither the joint between the negative electrode terminal and the negative electrode current collector nor the joint between the positive electrode terminal and the positive electrode current collector was provided with a water repellent layer.

Comparative Example 2

A secondary battery was produced in accordance with the same procedure as that described in Example 1 except that a water repellent layer was provided to cover a part of the joint between the negative electrode terminal and the negative electrode current collector, and a water repellent layer was provided to cover a part of the joint between the positive electrode terminal and the positive electrode current collector.

Comparative Example 3

A secondary battery was produced in accordance with the same procedure as that described in Example 1 except that a water repellent layer made of cellulose was used.

Comparative Example 4

A secondary battery was produced in accordance with the same procedure as that described in Example 1 except that a negative electrode terminal made of nickel was used.

(Measurement of Discharge Capacity and Charge-and-Discharge Efficiency and Evaluation of Cycle Life Performance)

For the secondary batteries produced in Examples 1 to 12 and Comparative Examples 1 to 4, measurement of the discharge capacity and the charge-and-discharge efficiency and evaluation of the cycle life performance were conducted under the following conditions.

Constant current/constant voltage charge-constant voltage discharge, in which the potential range was 2.7 V to 2 V, the current value was 5 C, and the charge termination capacity was 1000 mAh, was executed 10 cycles, and the discharge capacity and the charge-and-discharge efficiency after 10 cycles were measured.

The constant current/constant voltage charge-constant voltage discharge cycle under the above conditions was continuously executed, and the number of cycles with which the discharge capacity had a value of 70% of the maximum discharge capacity was evaluated as a cycle retention count.

The results are shown in Tables 1 and 2.

In Table 1, the column of "negative electrode current collector" describes a material used as a negative electrode current collector, and the column of "negative electrode terminal" describes a material used as a negative electrode terminal. The column of "joint structure" describes the number of a drawing corresponding to the structure of the joint between the negative electrode terminal and the negative electrode current collector.

In Table 2, the column of "water repellent material" describes the type of a material that forms a water repellent layer, the column of "contact angle" describes the numerical value of a contact angle with respect to water on a surface of the water repellent layer which does not face the joint, and the column of "negative electrode edge portion" describes whether a water repellent layer is provide on a negative electrode edge portion.

TABLE 1

| | Positive Electrode Active Material | Negative Electrode Active Material | Battery Structure | Negative Electrode Current Collector | Negative Electrode Terminal | Joint Structure | Terminal Connection Method |
|---|---|---|---|---|---|---|---|
| Example 1 | $LiMn_2O_4$ | $Li_4Ti_5O_{12}$ | Wound Structure | Aluminum with Cover Layer | Aluminum with Cover Layer | FIG. 3 | Welding |
| Example 2 | $LiMn_2O_4$ | $Li_4Ti_5O_{12}$ | Wound Structure | Aluminum with Cover Layer | Aluminum with Cover Layer | FIG. 3 | Welding |
| Example 3 | $LiMn_2O_4$ | $Li_4Ti_5O_{12}$ | Wound Structure | Aluminum with Cover Layer | Aluminum with Cover Layer | FIG. 3 | Welding |
| Example 4 | $LiMn_2O_4$ | $Li_4Ti_5O_{12}$ | Wound Structure | Aluminum with Cover Layer | Aluminum with Cover Layer | FIG. 3 | Welding |
| Example 5 | $LiMn_2O_4$ | $Li_4Ti_5O_{12}$ | Wound Structure | Aluminum with Cover Layer | Aluminum with Cover Layer | FIG. 3 | Welding |
| Example 6 | $LiMn_2O_4$ | $Li_4Ti_5O_{12}$ | Wound Structure | Zinc | Aluminum with Cover Layer | FIG. 3 | Contact Bonding |
| Example 7 | $LiMn_2O_4$ | $Li_4Ti_5O_{12}$ | Wound Structure | Aluminum with Cover Layer | Aluminum with Cover Layer | FIG. 8 | Welding |
| Example 8 | $LiMn_2O_4$ | $TiO_2$ | Wound Structure | Aluminum with Cover Layer | Aluminum with Cover Layer | FIG. 3 | Welding |
| Example 9 | $LiCoO_2$ | $Li_4Ti_5O_{12}$ | Wound Structure | Aluminum with Cover Layer | Aluminum with Cover Layer | FIG. 3 | Welding |
| Example 10 | $LiFePO_4$ | $Li_4Ti_5O_{12}$ | Wound Structure | Aluminum with Cover Layer | Aluminum with Cover Layer | FIG. 3 | Welding |
| Example 11 | $LiMn_2O_4$ | $Li_4Ti_5O_{12}$ | Stack Structure | Aluminum with Cover Layer | Aluminum with Cover Layer | FIG. 3 | Welding |
| Example 12 | $LiMn_2O_4$ | $Li_4Ti_5O_{12}$ | Wound Structure | Aluminum with Cover Layer | Aluminum with Cover Layer | FIG. 7 | Welding |
| Comparative Example 1 | $LiMn_2O_4$ | $Li_4Ti_5O_{12}$ | Wound Structure | Aluminum with Cover Layer | Aluminum with Cover Layer | FIG. 3 | Welding |
| Comparative Example 2 | $LiMn_2O_4$ | $Li_4Ti_5O_{12}$ | Wound Structure | Aluminum with Cover Layer | Aluminum with Cover Layer | FIG. 3 | Welding |
| Comparative Example 3 | $LiMn_2O_4$ | $Li_4Ti_5O_{12}$ | Wound Structure | Aluminum with Cover Layer | Aluminum with Cover Layer | FIG. 3 | Welding |
| Comparative Example 4 | $LiMn_2O_4$ | $Li_4Ti_5O_{12}$ | Wound Structure | Aluminum with Cover Layer | Nickel | FIG. 8 | Welding |

TABLE 2

| | Water Repellent Layer Forming Method | Water Repellent Layer Forming Portion | Water Repellent Material | Contact Angle (°) | Negative Electrode Edge Portion | Discharge Capacity (mAh) | Charge and Discharge Efficiency (%) | Cycle Retention Count |
|---|---|---|---|---|---|---|---|---|
| Example 1 | Tape | Whole Surface of Joint | Polyimide | 80 | — | 900 | 90 | 300 |
| Example 2 | Tape | Whole Surface of Joint | PTFE | 105 | — | 920 | 92 | 330 |
| Example 3 | Tape | Whole Surface of Joint | FEP | 115 | — | 950 | 96 | 380 |
| Example 4 | Tape | Whole Surface of Joint | Polyimide | 80 | Present | 950 | 95 | 370 |
| Example 5 | Press/Fuse | Whole Surface of Joint | PTFE | 105 | — | 900 | 90 | 300 |
| Example 6 | Tape | Whole Surface of Joint | Polyimide | 80 | — | 880 | 88 | 280 |
| Example 7 | Tape | Whole Surface of Joint | Polyimide | 80 | — | 900 | 90 | 300 |
| Example 8 | Tape | Whole Surface of Joint | Polyimide | 80 | — | 960 | 95 | 360 |
| Example 9 | Tape | Whole Surface of Joint | Polyimide | 80 | — | 900 | 90 | 290 |
| Example 10 | Tape | Whole Surface of Joint | Polyimide | 80 | — | 900 | 90 | 320 |
| Example 11 | Tape | Whole Surface of Joint | Polyimide | 80 | Present | 950 | 93 | 370 |
| Example 12 | Tape | Whole Surface of Joint | Polyimide | 80 | — | 900 | 90 | 300 |
| Comparative Example 1 | Tape | — | — | — | — | 700 | 70 | 200 |
| Comparative Example 2 | Tape | Part of Joint | Polyimide | 80 | — | 770 | 77 | 240 |
| Comparative Example 3 | Tape | Whole Surface of Joint | Cellulose | 60 | — | 740 | 90 | 250 |
| Comparative Example 4 | Tape | Whole Surface of Joint | Polyimide | 80 | — | 720 | 72 | 180 |

For example, as is apparent from comparison between Examples 1 to 3 and Comparative Example 1, when the water repellent layer is provided, hydrogen generation is suppressed, and the charge-and-discharge efficiency improves. In addition, even if the charge-and-discharge cycle is repeated, the alienation of SOC (State Of Charge) balance between the positive electrode and the negative electrode is suppressed, and an excellent cycle retention count is obtained.

As can be seen from Examples 1 to 3, as the contact angle becomes large, the discharge capacity and the charge-and-discharge efficiency increase, and the cycle retention count also increases.

Comparative Example 2 is an example in which the water repellent layer is provided not on the whole surface of the joint between the negative electrode terminal and the negative electrode current collector but on a part of the joint. Comparative Example 3 is an example in which the contact angle of the water repellent layer is smaller than 80°. Comparative Example 4 is an example in which a negative electrode terminal made of nickel is used. In Comparative Examples 2 to 4 as well, all of the discharge capacity, the charge-and-discharge efficiency, and the cycle retention count are inferior to Examples 1 to 3.

According to the result of Comparative Example 2, probably, hydrogen was generated from the joint that was not covered with the water repellent layer, resulting in poor performance. In Comparative Example 3, although the charge-and-discharge efficiency was high, the cycle retention count was low. This is probably because the contact angle was smaller than 80°, and therefore, the aqueous electrolyte gradually permeated the water repellent layer and reached the joint, and the water repellent layer peeled off along with hydrogen generation, resulting in early lowering of the charge-and-discharge efficiency. In Comparative Example 4, probably, hydrogen was generated from the negative electrode terminal made of nickel, resulting in early lowering of the negative electrode charge-and-discharge efficiency.

As is apparent from Example 4, when the water repellent layer is provided on the negative electrode edge portion, an excellent charge-and-discharge efficiency and cycle retention count can be achieved as compared to a case in which the water repellent layer is not provided (for example, Example 1).

As can be seen from Example 5, an excellent charge-and-discharge efficiency and cycle retention count can be achieved even in a case in which the water repellent layer is formed by pressing and fusing PTFE particles.

As is apparent from Example 6, an excellent charge-and-discharge efficiency and cycle retention count can be achieved even in a case in which zinc is used as the negative electrode current collector. Note that in Example 6, the negative electrode current collector (negative electrode tab portion) made of zinc and the negative electrode terminal made of aluminum including a coating layer made of boehmite are joined by contact bonding. Even if the metals of the negative electrode current collector and the negative electrode terminal are different from each other, a secondary battery can be produced by joining them using, for example, contact bonding.

As can be seen from Example 7, even if the negative electrode terminal and the negative electrode current collector are connected via a negative electrode lead, an excellent charge-and-discharge efficiency and cycle retention count can be achieved by providing the water repellent layer to cover all joints.

As shown in Examples 8 to 10, even if the negative electrode active material or positive electrode active material is changed from that of Example 1, an excellent charge-and-discharge efficiency and cycle retention count can be achieved, as is apparent. In example 8 in which $TiO_2$ was used, the negative electrode action potential was higher than in Example 1 in which $Li_4Ti_5O_{12}$ was used. For this reason, hydrogen generation was suppressed, and an excellent charge-and-discharge efficiency and cycle retention count could be achieved.

As is apparent from Example 11, an excellent charge-and-discharge efficiency and cycle retention count can be achieved even in a case in which the secondary battery has a stack structure.

As can be seen from Example 12, even if the negative electrode current collector is not provided with a negative electrode tab portion, an excellent charge-and-discharge efficiency and cycle retention count can be achieved by covering the joint between the negative electrode terminal and the negative electrode current collector with the water repellent layer.

According to at least one of the embodiments and examples described above, a secondary battery is provided. The secondary battery includes a negative electrode including a negative electrode current collector, a negative electrode terminal electrically connected to the negative electrode current collector, a joint electrically connecting the negative electrode terminal and the negative electrode current collector, a water repellent layer covering the joint, a positive electrode, and an aqueous electrolyte containing at least one of lithium salt and sodium salt. Each of the negative electrode terminal and the negative electrode current collector includes zinc or an alloy containing zinc, or the negative electrode includes a coating layer containing boehmite in at least a part of a surface of each of the negative electrode terminal and the negative electrode current collector. The joint is covered with the inner surface of the water repellent layer. A contact angle θ with respect to water on an outer surface of the water repellent layer satisfies 80°≤θ. Hence, hydrogen generation in the negative electrode can be suppressed. As a result, a secondary battery capable of achieving excellent cycle life performance can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A secondary battery comprising:
a negative electrode comprising a negative electrode current collector;
a negative electrode terminal electrically connected to the negative electrode current collector;
a joint electrically connecting the negative electrode terminal and the negative electrode current collector;
a water repellent layer covering the joint;
a positive electrode; and
an aqueous electrolyte containing at least one of lithium salt and sodium salt, wherein each of the negative electrode terminal and the negative electrode current collector comprises zinc or an alloy containing zinc, or the negative electrode comprises a coating layer containing boehmite in at least a part of a surface of each of the negative electrode terminal and the negative electrode current collector, and the joint is covered with an inner surface of the water repellent layer, and a contact angle θ with respect to water on an outer surface of the water repellent layer satisfies 80°≤θ.

2. The secondary battery according to claim 1, wherein the negative electrode current collector comprises a negative electrode tab portion, and at least a part of an edge portion of the negative electrode current collector except the negative electrode tab portion is covered with the water repellent layer.

3. The secondary battery according to claim 2, wherein a part of the negative electrode tab portion is covered with the coating layer.

4. The secondary battery according to claim 1, wherein a part of the negative electrode terminal is covered with the coating layer.

5. The secondary battery according to claim 1, wherein the contact angle θ of the water repellent layer with respect to water satisfies 100°≤θ.

6. The secondary battery according to claim 1, wherein the water repellent layer contains at least one water repellent material selected from the group consisting of polytetrafluoroethylene, tetrafluoroethylene, tetrafluoroethylene-hexafluoropropylene copolymer, polypropylene, polyethylene, polyimide, polystyrene, and silicone.

7. The secondary battery according to claim 1, wherein a thickness of the water repellent layer falls within a range of 0.1 μm to 500 μm.

8. The secondary battery according to claim 1, wherein each of the negative electrode terminal and the negative electrode current collector comprises the coating layer.

9. The secondary battery according to claim 1, wherein the negative electrode comprises a negative electrode active material-containing layer, and the negative electrode active material-containing layer comprises an active material containing at least one selected from the group consisting of a spinel-type lithium titanium oxide and an anatase-type titanium oxide.

10. A battery pack comprising the secondary battery according to claim 1.

11. The battery pack according to claim 10, further comprising an external power distribution terminal and a protective circuit.

12. The battery pack according to claim 10, further comprising plural of the secondary batteries, wherein the secondary batteries are electrically connected in series, in parallel, or in a combination of series connection and parallel connection.

13. A vehicle comprising the battery pack according to claim 10.

14. The vehicle according to claim 13, which comprises a mechanism configured to convert kinetic energy of the vehicle into regenerative energy.

* * * * *